US012743157B2

(12) United States Patent
Kim

(10) Patent No.: US 12,743,157 B2
(45) Date of Patent: Sep. 22, 2026

(54) SYSTEMS AND METHODS FOR THERMAL REFERRAL AND SENSE MASKING

(71) Applicant: Board of Regents, The University of Texas System, Austin, TX (US)

(72) Inventor: Jin Ryong Kim, Plano, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 19/061,364

(22) Filed: Feb. 24, 2025

(65) Prior Publication Data

US 2025/0271938 A1 Aug. 28, 2025

Related U.S. Application Data

(60) Provisional application No. 63/706,596, filed on Oct. 11, 2024, provisional application No. 63/556,797, filed on Feb. 22, 2024.

(51) Int. Cl.

*G06F 3/01* (2006.01)
*G06F 1/16* (2006.01)
*G06F 1/20* (2006.01)

(52) U.S. Cl.

CPC .............. *G06F 3/016* (2013.01); *G06F 1/163* (2013.01); *G06F 1/206* (2013.01); *G06F 3/014* (2013.01)

(58) Field of Classification Search

CPC .......... G06F 3/016; G06F 1/163; G06F 1/206; G06F 3/014

See application file for complete search history.

(56) References Cited

U.S. PATENT DOCUMENTS

| | | | | |
|---|---|---|---|---|
| 2019/0043322 | A1* | 2/2019 | Tachi | G06F 3/016 |
| 2022/0016413 | A1* | 1/2022 | John | A61N 1/0492 |
| 2022/0357798 | A1* | 11/2022 | Shin | G06F 3/014 |
| 2023/0409114 | A1* | 12/2023 | Sun | G06F 3/017 |
| 2024/0130922 | A1* | 4/2024 | Kong | A61H 3/061 |
| 2025/0152064 | A1* | 5/2025 | Connor | D03D 15/56 |
| 2025/0381364 | A1* | 12/2025 | Leaper | A61M 21/02 |

OTHER PUBLICATIONS

Upper Body Thermal Referral and Tactile Masking for Localized Feedback, IEE Transaction on Visualization and Computer Graphics, vol. 29, No. 5, May 2023.*

(Continued)

*Primary Examiner* — Md Saiful A Siddiqui

(74) *Attorney, Agent, or Firm* — Talem IP Law, LLP

(57) ABSTRACT

A device produces thermal sensations perceived as originating in a region not receiving thermal energy. The device includes: a thermal actuator for generating thermal energy within a thermal effect region of a human anatomy area; a tactile actuator for generating a tactile force in a tactile effect region of the human anatomy area, wherein the thermal effect region and the tactile effect region are non-overlapping; and an actuator controller connected to the thermal actuator and the tactile actuator, the actuator controller controlling activation and timing of the thermal actuator and the tactile actuator to effectuate a perception that the thermal energy is being applied to the tactile effect region of the human anatomy area.

20 Claims, 18 Drawing Sheets

(56) References Cited

OTHER PUBLICATIONS

Ackerley, Rochelle, et al., "Microneurography as a Tool to Study the Function of Individual C-Fiber Afferents in Humans: Responses from Nociceptors, Thermoreceptors, and Mechanoreceptors," Journal of Neurophysiology, Dec. 1, 2018 (accessible Sep. 26, 2018), pp. 2834-2846, vol. 120, issue 6.
Arai, Keisuke, et al., "Analysis of Paradoxical Phenomenon Caused by Presenting Thermal Stimulation on Three Spots," HCI International 2017—Posters' Extended Abstracts, Communications in Computer and Information Science, May 13, 2017, pp. 281-286, vol. 713, Springer International Publishing.
Arens, E., et al., "The Skin's Role in Human Thermoregulation and Comfort," Thermal and Moisture Transport in Fibrous Materials, 2006 (Available online Mar. 27, 2014), pp. 560-602, Elsevier.
Averbeck, B., et al., "Thermal Grill-evoked Sensations of Heat Correlate with Cold Pain Threshold and Are Enhanced by Menthol and Cinnamaldehyde," European Journal of Pain, May 2013 (Nov. 9, 2012), pp. 724-734, vol. 17, issue 5.
Bakkers, Mayienne, et al., "Temperature Threshold Testing: A Systematic Review," Journal of the Peripheral Nervous System, Mar. 22, 2013, pp. 7-18, vol. 18, issue 1.
Cai, Shaoyu, et al., "ThermAirGlove: A Pneumatic Glove for Thermal Perception and Material Identification in Virtual Reality," 2020 IEEE Conference on Virtual Reality and 3D User Interfaces (VR), Mar. 2020, pp. 248-257, IEEE.
Cain, William S., "Spatial Discrimination of Cutaneous Warmth," The American Journal of Psychology, Mar. 1973, pp. 169-181, vol. 86, issue 1.
Cataldo, Antonio, et al., "Thermal Referral: Evidence for a Thermoceptive Uniformity Illusion without Touch," Scientific Reports, Oct. 24, 2016, pp. 1-10, vol. 6, issue 1, article 35286.
Corbetta, Maurizio, et al., "Control of Goal-Directed and Stimulus-Driven Attention in the Brain," Nature Reviews Neuroscience, Mar. 1, 2002, pp. 201-215, vol. 3, issue 3.
Darian-Smith, Ian, et al., "Thermal Sensibility and Thermoreceptors," Journal of Investigative Dermatology, Jul. 1977 (available online Jan. 6, 2016), pp. 146-153, vol. 69, issue 1.
Delazio, Alexandra, et al., "Force Jacket: Pneumatically-Actuated Jacket for Embodied Haptic Experiences," Proceedings of the 2018 CHI Conference on Human Factors in Computing Systems, Apr. 21, 2018, 12 pages, ACM.
Digiovanni, Jeffrey J., et al., "Dominance of Persistence over Adaptation in Forward Masking," Attention, Perception, & Psychophysics, Oct. 2018 (accessible Jul. 3, 2018), pp. 1863-1869, vol. 80, issue 7.
Dyck, P. J., et al., "Cool, Warm, and Heat-pain Detection Thresholds: Testing Methods and Inferences about Anatomic Distribution of Receptors," (Abstract only), Neurology, Aug. 1, 1993, 1 page, vol. 43, issue 8.
El Ali, Abdallah, et al., "ThermalWear: Exploring Wearable On-Chest Thermal Displays to Augment Voice Messages with Affect," Proceedings of the 2020 CHI Conference on Human Factors in Computing Systems, Apr. 2020, pp. 1-14, paper 553, ACM.
Enriquez, Mario, et al., "Backward and Common-Onset Masking of Vibrotactile Stimuli," Brain Research Bulletin, Apr. 15, 2008, pp. 1-9, vol. 75, issue 6.
Evans, Paul M., et al., "Temporal Integration and Vibrotactile Backward Masking.," Journal of Experimental Psychology: Human Perception and Performance, 1986, pp. 160-168, vol. 12, issue 2.
Filingeri, Davide, "Neurophysiology of Skin Thermal Sensations," Comprehensive Physiology, Jun. 13, 2016, 78 pages, Wiley.
Gescheider, George A., et al., "A Four-Channel Analysis of the Tactile Sensitivity of the Fingertip: Frequency Selectivity, Spatial Summation, and Temporal Summation," Somatosensory & Motor Research, Jan. 2002, pp. 114-124, vol. 19, issue 2.
Gescheider, George A., et al., "Prediction of Vibrotactile Masking Functions," The Journal of the Acoustical Society of America, Nov. 1, 1982, pp. 1421-1426, vol. 72, issue 5.
Gescheider, George A., et al., "Vibrotactile Forward Masking: Evidence for Channel Independence," The Journal of the Acoustical Society of America, Aug. 1, 1983, pp. 474-485, vol. 74, issue 2.
Giesbrecht, Barry, et al., "Visual Masking during the Attentional Blink: Tests of the Object Substitution Hypothesis.," Journal of Experimental Psychology: Human Perception and Performance, Feb. 2003, pp. 238-258, vol. 29, issue 1.
Green, B. G., "Referred Thermal Sensations: Warmth versus Cold," (Abstract only), Sensory Processes, Sep. 1978, 1 page, vol. 2, issue 3.
Green, Barry G., "Localization of Thermal Sensation: An Illusion and Synthetic Heat," Perception & Psychophysics, Jul. 1977, pp. 331-337, vol. 22, issue 4.
Greenwood, Donald D., "Auditory Masking and the Critical Band," The Journal of the Acoustical Society of America, Apr. 1, 1961, pp. 484-502, vol. 33, issue 4.
Günther, Sebastian, et al., "Therminator: Understanding the Interdependency of Visual and On-Body Thermal Feedback in Virtual Reality," Proceedings of the 2020 CHI Conference on Human Factors in Computing Systems, Apr. 21, 2020, 14 pages, ACM.
Hamer, Russell D., et al., "Vibrotacile Masking of Pacinian and Non-Pacinian Channels," The Journal of the Acoustical Society of America, Apr. 1, 1983, pp. 1293-1303, vol. 73, issue 4.
Han, Teng, et al., "HydroRing: Supporting Mixed Reality Haptics Using Liquid Flow," Proceedings of the 31st Annual ACM Symposium on User Interface Software and Technology, Oct. 11, 2018, 13 pages, ACM.
Hayward, Vincent, "A Brief Overview of the Human Somatosensory System," Musical Haptics, Springer Series on Touch and Haptic Systems, May 3, 2018, pp. 29-48, Springer International Publishing.
Ho, Hsin-Ni, et al., "Mechanisms Underlying Referral of Thermal Sensations to Sites of Tactile Stimulation," The Journal of Neuroscience, Jan. 5, 2011, pp. 208-213, vol. 31, issue 1.
Ho, Hsin-Ni, et al., "Somatotopic or Spatiotopic? Frame of Reference for Localizing Thermal Sensations under Thermo-Tactile Interactions," Attention, Perception, & Psychophysics, Aug. 2010, pp. 1666-1675, vol. 72, issue 6.
Hollins, Mark, et al. "Vibrotactile Adaptation Impairs Discrimination of Fine, but Not Coarse, Textures," Somatosensory & Motor Research, Jan. 2001 (accessible Jul. 10, 2009), pp. 253-262, vol. 18, issue 4.
Hülsmann, Felix, et al., "Wind and Warmth in Virtual Reality: Implementation and Evaluation," Proceedings of the 2014 Virtual Reality International Conference, Apr. 9, 2014, 8 pages, ACM.
Israr, Ali, et al., "Tactile Brush: Drawing on Skin with a Tactile Grid Display," Proceedings of the SIGCHI Conference on Human Factors in Computing Systems, May 7, 2011, 10 pages, ACM.
Ivanov, K. P., "Subject of Temperature Control and the Main Function of Thermoregulation of an Organism," Journal of Thermal Biology, Oct. 1999, pp. 415-421, vol. 24, issue 5-6.
Iwai, Daisuke, et al., "Non-Contact Thermo-Visual Augmentation by IR-RGB Projection," IEEE Transactions on Visualization and Computer Graphics, Apr. 1, 2019 (accessible Aug. 2015), pp. 1707-1716, vol. 25, issue 4.
Jones, Lynette. A., et al., "Warm or Cool, Large or Small? The Challenge of Thermal Displays," IEEE Transactions on Haptics, Jan. 2008, pp. 53-70, vol. 1, issue 1.
Kim, Jin Ryong, et al., "A Masking Study of Key-Click Feedback Signals on a Virtual Keyboard," Haptics: Perception, Devices, Mobility, and Communication, Lecture Notes in Computer Science, 2012, pp. 247-257, vol. 7282, Springer Berlin Heidelberg.
Lederman, Susan J., et al., "Tactile and Haptic Illusions," IEEE Transactions on Haptics, Oct. 2011 (accessible Feb. 10, 2011), pp. 273-294, vol. 4, issue 4.
Lee, Seohu, et al., "Soft Wearable Thermo+touch Haptic Interface for Virtual Reality," iScience, Dec. 20, 2024, 15 pages, vol. 27, issue 12, article 111303, Elsevier BV.
Levin, Harvey S., et al., "A Comparison of Ipsilateral and Contralateral Effects of Tactile Masking," The American Journal of Psychology, Jun. 1973, pp. 435-444, vol. 86, issue 2.

(56) References Cited

OTHER PUBLICATIONS

Liu, Yuhu, et al., "ThermoCaress: A Wearable Haptic Device with Illusory Moving Thermal Stimulation," Proceedings of the 2021 CHI Conference on Human Factors in Computing Systems, May 2021, 12 pages, ACM.
Luo, Maohui, et al., "High-Density Thermal Sensitivity Maps of the Human Body," Building and Environment, Jan. 2020 (accessible Oct. 7, 2019), 29 pages, vol. 167, article 106435.
Mackevicius, Emily L., et al., "Millisecond Precision Spike Timing Shapes Tactile Perception," The Journal of Neuroscience, Oct. 31, 2012, pp. 15309-15317, vol. 32, issue 44.
Mcglone, Francis, et al., "Discriminative and Affective Touch: Sensing and Feeling," Neuron, May 21, 2014, pp. 737-755, vol. 82, issue 4.
Mckemy, David D., "The Molecular and Cellular Basis of Cold Sensation," ACS Chemical Neuroscience, Feb. 20, 2013 (accessible Nov. 20, 2012), pp. 238-247, vol. 4, issue 2.
Meador, K. J., et al., "Physiology of Somatosensory Perception: Cerebral Lateralization and Extinction," Neurology, Sep. 1998, pp. 721-727, vol. 51, issue 3.
Meyer, Richard A., et al., "A Laser Stimulator for the Study of Cutaneous Thermal and Pain Sensations," IEEE Transactions on Biomedical Engineering, Jan. 1976 (available online Mar. 12, 2007), pp. 54-60, vol. BME-23, issue 1.
Morin, C., et al., "Temporal and Qualitative Properties of Cold Pain and Heat Pain: A Psychophysical Study:," Pain, Jan. 1998, pp. 67-73, vol. 74, issue 1.
Park, Jaejun, et al., "A Preliminary Study on the Perceptual Independence Between Vibrotactile and Thermal Senses," Haptics: Science, Technology, Applications, Lecture Notes in Computer Science, May 20, 2022, pp. 75-83, vol. 13235, Springer International Publishing.
Peiris, Roshan Lalintha, et al., "ThermoVR: Exploring Integrated Thermal Haptic Feedback with Head Mounted Displays," Proceedings of the 2017 CHI Conference on Human Factors in Computing Systems, May 2, 2017, pp. 5452-5456, ACM.
Plaghki, L., et al., "How Do We Selectively Activate Skin Nociceptors with a High Power Infrared Laser? Physiology and Biophysics of Laser Stimulation," Neurophysiologie Clinique/Clinical Neurophysiology, Dec. 10, 2003, pp. 269-277, vol. 33, issue 6.
Ranasinghe, Nimesha, et al., "Season Traveller: Multisensory Narration for Enhancing the Virtual Reality Experience," Proceedings of the 2018 CHI Conference on Human Factors in Computing Systems, Apr. 21, 2018 (accessible Apr. 21, 2018), pp. 1-13, ACM.
Saal, Hannes P., et al., "Simulating Tactile Signals from the Whole Hand with Millisecond Precision," Proceedings of the National Academy of Sciences, Jul. 11, 2017 (accessible Jun. 26, 2017), pp. E5693-E5702, vol. 114, issue 28.
Schubert, Ruth, et al., "Now You Feel It—Now You Don't: ERP Correlates of Somatosensory Awareness," Psychophysiology, Jan. 2006, pp. 31-40, vol. 43, issue 1.
Singhal, Anshul, et al., "Perceptual Interactions in Thermo-Tactile Displays," 2017 IEEE World Haptics Conference (WHC), Jun. 2017, pp. 90-95, IEEE.
Zook, Zane A., et al., "Effect of Tactile Masking on Multi-Sensory Haptic Perception," IEEE Transactions on Haptics, Jan. 1, 2022 (accessible Sep. 16, 2021), pp. 212-221, vol. 15, issue 1.
Singhal, Yatharth, et al., "Mid-Air Thermo-Tactile Feedback Using Ultrasound Haptic Display," Proceedings of the 27th ACM Symposium on Virtual Reality Software and Technology, Dec. 8, 2021, 11 pages, ACM.
Son, Hyungki, et al., "Upper Body Thermal Referral and Tactile Masking for Localized Feedback," IEEE Transactions on Visualization and Computer Graphics, May 2023, pp. 2211-2219, vol. 29, issue 5.
Stevens, Joseph C., "Temperature and the Two-Point Threshold," Somatosensory & Motor Research, Jan. 1989 (published online: Jul. 10, 2009), pp. 275-284, vol. 6, issue 3.
Stevens, Joseph C., "Temperature Can Sharpen Tactile Acuity," Perception & Psychophysics, Nov. 1982, pp. 577-580, vol. 31, issue 6.
Tan, Chan Lek, et al., "Regulation of Body Temperature by the Nervous System," Neuron, Apr. 4, 2018, pp. 31-48, vol. 98, issue 1.
Tan, Hong Z., et al., "Temporal Masking of Multidimensional Tactual Stimuli," The Journal of the Acoustical Society of America, Dec. 1, 2003, pp. 3295-3308, vol. 114, issue 6.
Taus, Richard H., et al., "Spatial Localization of Warmth," Perception & Psychophysics, Mar. 1975, pp. 194-196, vol. 17, issue 2.
Vardar, Yasemin, et al., "Tactile Masking by Electrovibration," IEEE Transactions on Haptics, Oct. 1, 2018 (accessible Jul. 11, 2018), pp. 1-12, vol. 11, issue 4.
Vellei, Marika, et al., "Dynamic Thermal Perception: A Review and Agenda for Future Experimental Research," Building and Environment, Nov. 2021 (accessible Aug. 23, 2021), 11 pages, vol. 205, article 108269.
Wang, Haokun, et al., "Fabric Thermal Display Using Ultrasonic Waves," 2023 IEEE International Symposium on Mixed and Augmented Reality (ISMAR), Oct. 16, 2023, pp. 336-345, IEEE.
Watanabe, Ryo, et al., "Mutual Referral of Thermal Sensation between Two Thermal-Tactile Stimuli," 2014 IEEE Haptics Symposium (Haptics), Feb. 2014, 4 pages, IEEE.
Weerakkody, N. S., et al., "Impairment of Human Proprioception by High?frequency Cutaneous Vibration," The Journal of Physiology, Jun. 15, 2007 (accessible Apr. 5, 2007), pp. 971-980, vol. 581, issue 3.
Xiao, Rui, et al., "Temperature Sensation: From Molecular Thermosensors to Neural Circuits and Coding Principles," Annual Review of Physiology, Feb. 10, 2021 (accessible Oct. 21, 2020), pp. 205-230, vol. 83, issue 1.
Yang, Gi Han, et al., "Spatial Acuity and Summation on the Hand: The Role of Thermal Cues in Material Discrimination," Attention, Perception & Psychophysics, Jan. 1, 2009, pp. 156-163, vol. 71, issue 1.
Zhu, Kening, et al., "A Sense of Ice and Fire: Exploring Thermal Feedback with Multiple Thermoelectric-Cooling Elements on a Smart Ring," International Journal of Human-Computer Studies, Oct. 2019 (accessible Jul. 10, 2019), pp. 234-247, vol. 130.
Alles, David S., "Information Transmission by Phantom Sensations," IEEE Transactions on Man-Machine Systems, Mar. 31, 1970, pp. 85-91, vol. 11, issue 1.
Averbeck, Beate, et al., "Sex Differences in Thermal Detection and Thermal Pain Threshold and the Thermal Grill Illusion: A Psychophysical Study in Young Volunteers," Biology of Sex Differences, Dec. 2017 (accessible Sep. 1, 2017), 13 pages, vol. 8, issue 1.
Brooks, Jas, et al., "Trigeminal-Based Temperature Illusions," Proceedings of the 2020 CHI Conference on Human Factors in Computing Systems, Apr. 21, 2020 (accessible Apr. 23, 2020), pp. 1-12, ACM.
Burtt, Harold E., "Tactual Illusions of Movement.," Journal of Experimental Psychology, Oct. 1917, pp. 371-385, vol. 2, issue 5.
Caeiro-Rodríguez, Manuel, et al., "A Systematic Review of Commercial Smart Gloves: Current Status and Applications," Sensors, Apr. 10, 2021 (accessible Apr. 10, 2021), 37 pages, vol. 21, issue 8.
Chen, Zikun, et al., "ThermoReality: Thermally Enriched Head Mounted Displays for Virtual Reality," ACM SIGGRAPH 2017 Posters, Jul. 30, 2017, 2 pages, ACM.
Günther, Sebastian, et al., "Assessing the Influence of Visual Cues in Virtual Reality on the Spatial Perception of Physical Thermal Stimuli," Proceedings of the CHI Conference on Human Factors in Computing Systems, May 11, 2024, pp. 1-12, ACM.
Han, Teng, et al., "Mouillé: Exploring Wetness Illusion on Fingertips to Enhance Immersive Experience in VR," Proceedings of the 2020 CHI Conference on Human Factors in Computing Systems, Apr. 21, 2020, 10 pages, ACM.
Seo, Jongman et al., "Initial Study for Creating Linearly Moving Vibrotactile Sensation on Mobile Device," 2010 IEEE Haptics Symposium, Mar. 2010, pp. 67-70, IEEE.
Kim, Hojoong, et al., "Recent Advances in Wearable Sensors and Integrated Functional Devices for Virtual and Augmented Reality Applications," Advanced Functional Materials, Sep. 2021 (accessible Oct. 14, 2020), pp. 1-12, vol. 31, issue 39, article 2005692.

(56) References Cited

OTHER PUBLICATIONS

Kirman, Jacob H., "Tactile Apparent Movement: The Effects of Interstimulus Onset Interval and Stimulus Duration," Perception & Psychophysics, Jan. 1974, pp. 1-6, vol. 15, issue 1.
Leek, Marjorie R., "Adaptive Procedures in Psychophysical Research," Perception & Psychophysics, Nov. 2001, pp. 1279-1292, vol. 63, issue 8.
Levitt, H., "Transformed Up-Down Methods in Psychoacoustics," The Journal of the Acoustical Society of America, Feb. 1, 1971, pp. 467-477, vol. 49, issue 2B.
Lu, Jasmine, et al., "Chemical Haptics: Rendering Haptic Sensations via Topical Stimulants," The 34th Annual ACM Symposium on User Interface Software and Technology, Oct. 10, 2021, pp. 239-257, ACM.
Peiris, Roshan Lalintha, et al., "LiquidReality: Wetness Sensations on the Face for Virtual Reality," Haptics: Science, Technology, and Applications, Lecture Notes in Computer Science, Jun. 6, 2018, pp. 366-378, vol. 10894, Springer International Publishing.
Peiris, Roshan Lalitha, et al., "ThermalBracelet: Exploring Thermal Haptic Feedback Around the Wrist," Proceedings of the 2019 CHI Conference on Human Factors in Computing Systems, May 2, 2019, pp. 1-11, paper 170. ACM.
Ranasinghe, Nimesha, et al., "Ambiotherm: Enhancing Sense of Presence in Virtual Reality by Simulating Real-World Environmental Conditions," Proceedings of the 2017 CHI Conference on Human Factors in Computing Systems, May 2, 2017, pp. 1731-1742, ACM.
Sherrick, Carl E., et al., "Apparent Haptic Movement," Perception & Psychophysics, May 1966, pp. 175-180, vol. 1, issue 3.
Shirota, Kenichiro, et al., "Liquid-VR—Wetness Sensations for Immersive Virtual Reality Experiences," Haptic Interaction, Lecture Notes in Electrical Engineering, May 14, 2019, pp. 252-255, vol. 535, Springer Singapore.
Sun, Zhongda, et al., "A Skin-like Multimodal Haptic Interface," Nature Electronics, Dec. 20, 2023, pp. 941-942, vol. 6, issue 12.
Békésy, G. V., "Sensations on the Skin Similar to Directional Hearing, Beats, and Harmonics of the Ear," The Journal of the Acoustical Society of America, Apr. 1, 1957, pp. 489-501, vol. 29, issue 4.
Van Wegen, Myla, et al., "An Overview of Wearable Haptic Technologies and Their Performance in Virtual Object Exploration," Sensors, Feb. 1, 2023, pp. 1-14, vol. 23, issue 3, article 1563.
Wang, Haokun, et al., "Let It Snow: Designing Snowfall Experience in VR," Proceedings of the ACM on Interactive, Mobile, Wearable and Ubiquitous Technologies, Jun. 2024 (accessible May 13, 2024), pp. 1-24, vol. 8, issue 2, article 54.
Zhang, Bowen, et al., "PneuMod: A Modular Haptic Device with Localized Pressure and Thermal Feedback," Proceedings of the 27th ACM Symposium on Virtual Reality Software and Technology, Dec. 8, 2021, 7 pages, ACM.
Weart S.R.L., "TouchDiver," Weart, 2022, Retrieved: Oct. 15, 2025, Retrieved from: https://web.archive.org/web/20221114160510/https://www.weart.it/touchdiver/, 11 pages.
Kim, Seung-Won, et al., "Thermal Display Glove for Interacting with Virtual Reality," Scientific Reports, Jul. 9, 2020, pp. 1-12, vol. 10, issue 1, article 11403.

* cited by examiner

| Thermal Profile 165 | | |
|---|---|---|
| **Time Start** | **Time End** | **Thermal Perception Region** |
| Time1 | Time2 | Region including 162 and 164 |

| Actuator Profile 166 | | |
|---|---|---|
| **Actuator** | **Time Start** | **Time End** |
| 110 | Time1 - ThermDelay | Time2 - ThermPersist |
| 120 | Time1 | Time2 |
| 130 | Time1 | Time2 |

Thermal Profile 175

| Time Start | Time End | Thermal Perception Region |
|---|---|---|
| Time1 | Time2 | Region including 170 |
| Time2 | Time3 | Region including 172 |

Actuator Profile 178

| Actuator | Time Start | Time End |
|---|---|---|
| 110 | Time1 - ThermDelay | Time3-ThermPersist |
| 120 | Time1 - TactDelay | Time2 + MovementOverlap |
| 122 | Time2 – TactDelay | Time3 |

SYSTEMS AND METHODS FOR THERMAL REFERRAL AND SENSE MASKING

CROSS-REFERENCE TO RELATED APPLICATION(S)

This application claims the benefit of U.S. Provisional Application No. 63/556,797, filed on Feb. 22, 2024 and U.S. Provisional Application No. 63/706,596, filed on Oct. 11, 2024.

BACKGROUND

Wearable devices having a thermal actuator that effectuates a change in human perceivable heat have begun to emerge as an option for extended reality (XR), which includes virtual reality, augmented reality, and various simulators. Thermal interactions enabled via a wearable peripheral increase a sense of immersion and presence.

Existing efforts for thermal sensations during immersion have focused on hardware solutions to deliver heat energy to portions of a human body in various ways, which include subjecting a user to thermal radiation, to fluid containment pathways where a fluid is heated/cooled, to use of infrared lasers to generate heat, to using thermoelectrical devices that produce localized heat/cooling.

BRIEF SUMMARY

Systems and methods for thermal referral and sense masking are described. A thermal actuator generates heat at one point of a human body, yet is perceived at a different point, which is controllable. This perceptual effect is a result of a thermal referral phenomenon combined with a variation of tactile masking called sense masking. The thermo-tactile interaction caused by a thermal actuator and a tactile actuator working in concert creates a perceptual illusion. Specially, a user "feels" the heat/cooling at a point a tactile actuator generates a non-temperature related tactile force. This perceptual redirection allows for thermal output of a thermal actuator to be perceived a controllable distance from the thermal actuator itself.

In some aspects, a device produces thermal sensations perceived as originating in a region not receiving thermal energy. The device includes: a thermal actuator for generating thermal energy within a thermal effect region of a human anatomy area; a tactile actuator for generating a tactile force in a tactile effect region of the human anatomy area, wherein the thermal effect region and the tactile effect region are non-overlapping; and an actuator controller connected to the thermal actuator and the tactile actuator, the actuator controller controlling activation and timing of the thermal actuator and the tactile actuator to effectuate a perception that the thermal energy is being applied to the tactile effect region of the human anatomy area.

In some aspects, a method produces thermal sensations perceived as originating in a region not receiving thermal energy. The method includes: triggering activation of a thermal actuator and a tactile actuator, each positioned within a human anatomy area; generating thermal energy using the thermal actuator within a thermal effect region of the human anatomy area; generating a tactile sensation using the tactile actuator in a tactile effect region of the human anatomy area, wherein the thermal effect region and the tactile effect region are non-overlapping; and timing the generating of the thermal energy and the generating of the tactile sensation to effectuate a perception that the thermal energy is being applied to the tactile effect region of the human anatomy area.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Systems and methods for thermal referral and sense masking are described. An illusion is created that perceptually shifts an application of thermal energy from a location where the thermal energy is applied to a different region where a tactile force is applied. This perceptual shift results from a thermal referral phenomenon combined with sense masking. The thermal referral phenomenon occurs when a simultaneous presentation of thermal and tactile stimulation on different skin sites produces an illusory thermal sensation at the site of tactile stimulation. Sense masking, which is sometimes referred to as thermal masking, is a phenomenon induced by thermal referral to completely mask the original thermal sensation. Thermal referral and sense masking are thermophysiological sensations as opposed being properties of thermal physics.

Figure 1A:
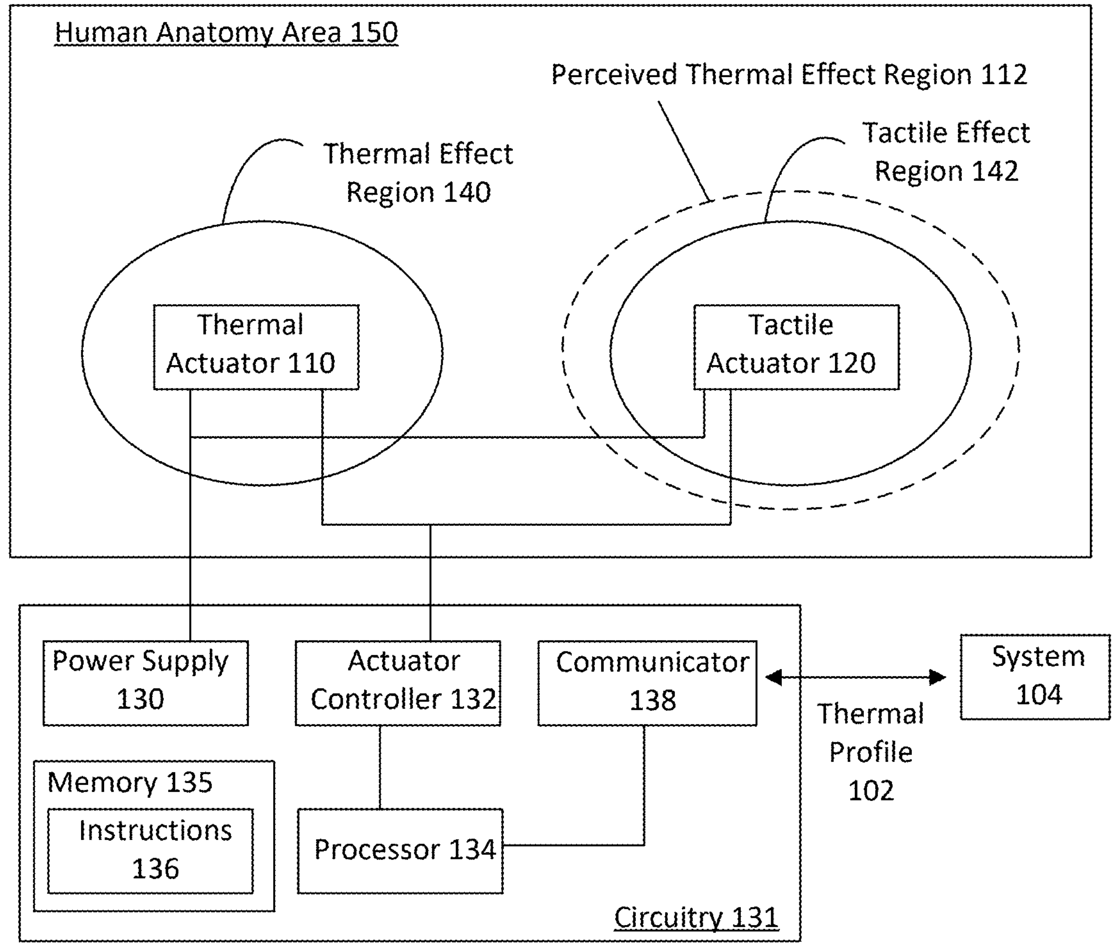
FIG. 1A shows a diagram within which thermal energy from a thermal actuator is perceived as originating from a perceived location, which is different from an actual location to which thermal energy is applied.

FIG. 1A shows a diagram within which thermal energy from a thermal actuator 110 is perceived as originating from a perceived location, which is different from an actual location to which the thermal energy is applied. In the system, thermal actuator 110 generates thermal energy within the thermal effect region 140, which is sensed at a perceived thermal effect region 112. A tactile actuator 120 generates a tactile force within a tactile effect region 142 used to define positioning of the perceived thermal effect region 112. The thermal effect region, the tactile effect region 142, and the perceived thermal effect region 112 are all located within a human anatomy area 150.

Quantifiable boundaries based on physics can be used to define boundaries of the thermal effect region 140 and the tactile effect region 142. In certain embodiments, the thermal effect region 140 and the tactile effect region 142 are non-overlapping.

The perceived thermal effect region 112 is a thermophysiologically defined region within which a human perceives a sensation of heating/cooling. Thermophysiology is the study of how the body responds to heat and cold. Thermal referral shifts the sensation of heating/cooling from thermal effect region 140 to perceived thermal effect region 112. Sense masking results in a human not perceiving heating/cooling that is measurably present in thermal effect region 140. A sensation of thermal energy, whether heating or cooling above/below human skin temperature is perceived as occurring in the perceived thermal effect region 112 and not in the thermal effect region 140. Certain people will feel the thermal sensation within the thermal effect region 140 as well. (see FIG. 5A discussing states of No Referral, Weak Referral, Strong Referral, and Masking)

An actuator controller 132, which is connected to the thermal actuator 110 and the tactile actuator 120, controls activation and timing of the thermal actuator 110 and the tactile actuator 120 to effectuate a perception that the thermal energy is being applied proximate to the tactile effect region 142 of the human anatomy area 150. In certain embodiments, a set of different controllers, such as one for thermal actuator 110 and a different one for tactile actuator 120 can be used. Regardless, the timing of delivery of the tactile force establishes a psychological illusion that the thermal energy is present in the perceived thermal effect region 112 and not in thermal effect region 140.

The shape, size, area, and exact position of the perceived thermal effect region 112 can deviate slightly from person to person, as some deviations in perception of temperature exist from human to human. Despite these variations, perceived thermal effect region 112 is approximately equal to tactile effect region 142.

The thermal actuator 110 and tactile actuator 120 are often integrated into a device, such as a wearable peripheral used for extended reality applications, medical rehabilitation device, or even thermally adjustable clothing. Both thermal actuator 110 and tactile actuator 120 can be wearable actuators, which are a subcategory of wearable technology. A wearable actuator is one that can be worn, embedded into fabric or accessories, or able to be integrated/tattooed onto or under the skin. In a wearable use case, a frame, such as a fabric mesh, is coupled to the thermal actuator 110 and the tactile actuator 120 to enable a relative position to be established with regard to the human anatomy area 150. Wearable actuators, such as actuator 110 and 120, are often components of extended reality or virtual reality immersion system.

Additional device components interoperating with thermal actuator 110 and tactile actuator 120 include circuitry 131, processor 134, memory 135, instructions 136, communicator 138, and the like.

Circuitry 131 includes motherboards, cards, electronic components, wiring and other electrical pathways and the like that interconnect the various components. Processor 134 is a microprocessor able to execute instructions 136 (e.g., software/firmware) to cause an integrated device/peripheral to perform a series of steps or functions. Functional components of actuator controller 132 and/or communicator 138 can be performed via circuitry 131 or by a subset of instructions 136 being executed by processor 134. Memory 135 includes non-persistent (e.g., RAM) and persistent (ROM, solid state memories, data stores, and the like) able to store instructions, variables, profile information, and related information. The communicator 138 enables communications with another system 104. In certain embodiments where FIG. 1A components are part of a peripheral, the system 104 can include a computing system, such as a computer, gaming console, mobile telephone, tablet, or extended reality computing device.

In some embodiments, a thermal profile 102 is communicated from the system 104 to communicator 138, where thermal profile 102 can indicate timing, location, and values where thermal energy is to be applied. The thermal profile 102 can be time and position synchronized to thermal output regions a virtual environment, an augmented reality environment, or a simulation environment.

For example, an extended reality application can define a region within which a temperature output is to be produced, which is converted and conveyed into the thermal profile 102, which is converted by circuitry 131 and related components into an actuator profile, which selectively activates thermal actuator 110 and tactile actuator 120. The thermal profile 102 can effectively define characteristics of the perceived thermal effect region 112, which correspond to a virtual environment defined human anatomy area 150. Accordingly, if an extended reality application determines a temperature is to be felt on a user's arm in a localized anatomy position per an extended reality environment condition/interaction, a wearable device including thermal actuator 110 and tactile actuator 120 on the user's arm is triggered. Wearable computing devices/peripherals can include multiple thermal actuators 110 and tactile actuators 120 attached at different body locations, which can control where on a body applications of temperature sensations are to occur.

Figure 1B:
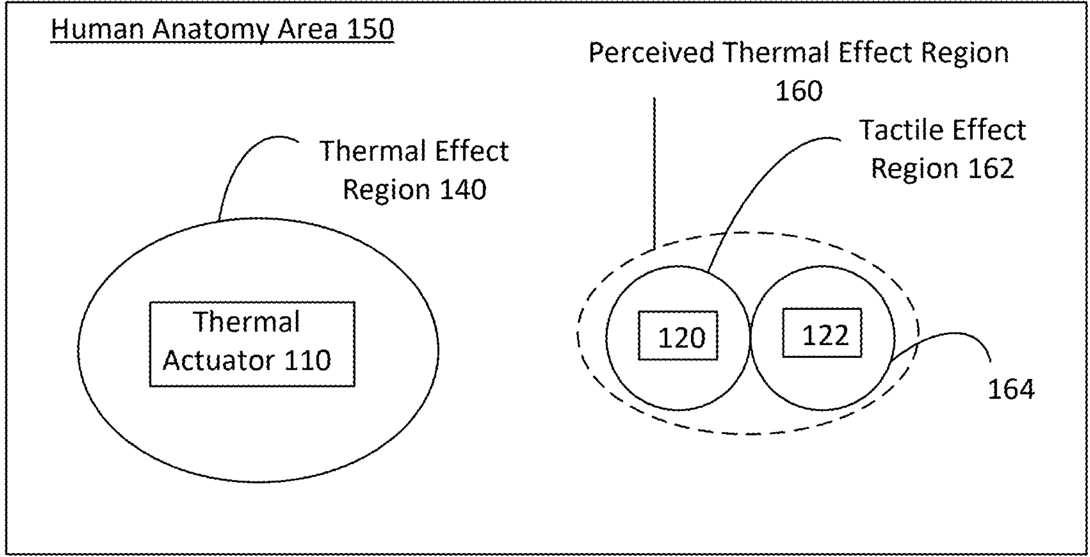
FIG. 1B illustrates a system where more than one tactile actuator is concurrently activated to expand a perceived thermal effect region.

More than one tactile actuator 120 can be activated at the same time that a thermal actuator 110 is activated, which results in a perceived thermal effect region 112 encompassing the tactile effect regions of both activated tactile actuators (see FIG. 1B). In another example, a set of tactile actuators 120 can be activated in sequence over a duration that a thermal actuator 110 is active to create an illusion or perception that the thermal energy is moving (See FIG. 1C). In certain other embodiments, multiple thermal actuators 110 can be activated at a time one or more tactile actuators 120 are activated (see FIG. 4A), which can increase a magnitude of thermal energy being perceived in the perceived thermal effect region 160.

Because latency time of tactile actuator 120 can be significantly less than that of a thermal actuator 110 an ability to move perceived thermal energy through selective activations of a set of tactile actuators 120 permits perceived thermal effects to be produced in relatively short time frames that would not otherwise be possible. Complex thermal profiles including generation of heat blooms, pulses, and the like are similarly possible through the fine level of control able to be achieved using the tactile actuator 120 or a set of tactile actuators working in concert.

As used herein, thermal actuator 110 converts electricity into a temperature differential. Thermal actuator 110 can use thermoreceptors found in the skins dermis that are responsible for temperature sensitivity. A transfer of thermal energy from a thermal actuator 110 to the skin results in a sensation of warmth or heat. A transfer of thermal energy from the skin to the thermal actuator (e.g., pulling heat from the skin) results in a cooling sensation. A thermal actuator 110 can use conduction, convection, and radiation to perform a thermal transfer. Thermal actuators 110 include Peltiers infrared lasers, thermal radiation generators, heat carrying liquid fluid systems, and the like.

Tactile actuator 120 is a component that converts electrical energy into a force able to be tactilely sensed. Tactile actuator 120 is a mechanical, electrical, or other system to simulate touch, motion, or vibration. Tactile actuator 120 can provide vibrotactile feedback, force feedback, electro tactile feedback, and ultrasound tactile feedback. Tactile actuators 120 include eccentric rotating mass (ERM) actuators, linear resonant actuators (LRA), piezo haptic actuators, solenoid actuators, and ultrasonic transducers.

FIG. 1B illustrates a system where more than one tactile actuator 120, 122 is concurrently activated to expand the perceived thermal effect region 160. Thermal sensations can be regionally defined by a thermal profile 165, which defines timing, boundaries, and energy amounts for the perceived thermal effect region 160. In a basic scenario, a single thermal actuator 110 is activated to generate thermal energy in thermal effect region 140. At the same time, two tactile actuators 120 and 122 are activated to produce a force able to be tactilely sensed. Tactile actuator 120 produces a tactile force in tactile effect region 162; tactile actuator 122 produces a tactile force in tactile effect region 164.

Thermal profile 165 can be an implementation independent definition for a perceived thermal effect region 160. In an event driven programming paradigm, the thermal profile 102 defines output to be generated for a localizable thermal event. An extended reality application configured for thermal output can use thermal profile 165 or an equivalent definition. Different wearables can use different thermal-dynamic principles and components to respond to produce output consistent with the thermal profile 165.

An actuator profile 166 determines a set of activation signals and values to be presented to a set of thermal actuators 110 and tactile actuators 120 and 122 to achieve the thermal profile 165. The actuator profile 166 can be a hardware dependent implementation. In embodiments, device drivers and similar software/firmware artifacts can be used when creating the actuator profile 166 given thermal profile 165.

In the specific example of FIG. 1B, the perceived thermal effect region 160 defined by thermal profile 165 creates a heat sensation between Time1 and Time2. The perceived thermal effect region 160 includes a region defined by tactile effect region 162 and 164.

Per the actuator profile 166, the thermal actuator 110 is activated at a Time1 minus the ThermalDelay time. The ThermalDelay time represents a time required to generate the desired amount of heat, which acknowledges an activation delay exists (e.g., the thermal actuator 110 must "heat up" or "cool down". Similarly, thermal actuator 110 persists for a time period (e.g., ThermPersist) before returning to ambient temperature. Values for ThermDelay and ThermPersist are hardware dependent. In some embodiments, user specific idiosyncrasies and preferences can be accounted for in generating the actuator profile 166 from the thermal profile 165.

Tactile actuators 120 and 122 generally do not have any significant activation time or persistence so each tactile actuator 120 and 122 can be activated at Time1 and deactivated at Time2 as shown. Generally, in order to achieve "effective" activation of thermal actuator 110 "at the same time" as the tactile actuators 120 and 122, the thermal actuator 110 will be activated first in order to account for the thermal delay (ThermDelay).

Figure 1C:
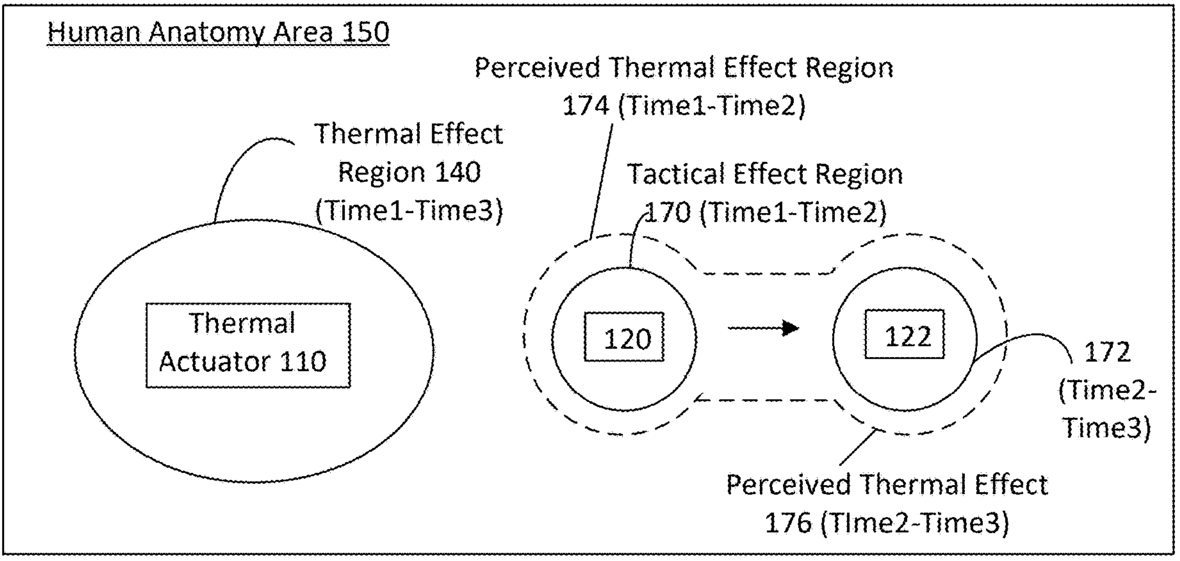
FIG. 1C illustrates a system where more than one tactile actuators are activated in sequence to effectuate movement of a thermal sensation.

FIG. 1C illustrates a system where more than one tactile actuators 120 are activated in sequence to effectuate movement of the thermal sensation. As shown by thermal profile 175, a thermal sensation is to be perceived between Time1 and Time2 within perceived thermal effect region 174 (e.g. Time1 to Time2), which is approximately equal to tactile effect region 170. Between a defined duration between Time2 and Time3 the thermal sensation moves to perceived thermal effect region 176, which is approximately equal to tactical effect region 172. The actuator controller 132 sequentially activates the plurality of tactile actuators while the thermal actuator is activated to effectuate a perception that the thermal energy is moving.

Per actuator profile 178, thermal actuator 110 is to generate thermal energy between Time1 and Time3 with some allowance being made for thermal activation delay (ThermDelay) and for thermal persistence (ThermPersist). It should be noted that even though the thermal sensation is moved between Time1 and Time3, thermal actuator 110 is actively generating thermal energy within the same (non-moving) thermal effect region 140. The perception or illusion of the thermal energy being applied "elsewhere" is a result of thermal referral and sense masking.

Although minimal delays are generally present for activating most tactical actuators 120 and 122, in some scenarios these delays can be quantified and accounted for. Thus, actuator profile 178 shows actuator 120 being activated at Time1−TactDelay, where TactDelay represents the delay between activation time and sensation delivery for actuator 120. A different TactDelay can apply to tactical actuator 122, which is activated at Time2−TactDelay. In some embodiments, the movement illusion can be facilitated by having some overlap where both tactile actuator 120 and tactile actuator 122 are concurrently activated. This is expressed in actuator profile 178 by having actuator 120 deactivated at Time2+MovementOverlap, where MovementOverlap is the time of concurrent activation.

In some embodiments, complex thermal profiles 175 and corresponding actuator profiles 178 are able to be constructed for thermal sensations that move and have increasing/decreasing regions over time.

FIGS. 1A, 1B, and 1C, expressly include human anatomy area 150, which is a thermal mobility region. A thermal mobility region refers to a region within which the sensation of thermal energy is able to be moved by thermal referral and masked by sense masking. The distance that thermal sensations are able to be relocated and masked is limited and is based somewhat on which specific areas of a human anatomy are being affected. Further, the human anatomy does not permit heat sensations to easily cross certain boundaries referred to as anatomy boundaries.

Figure 1D:
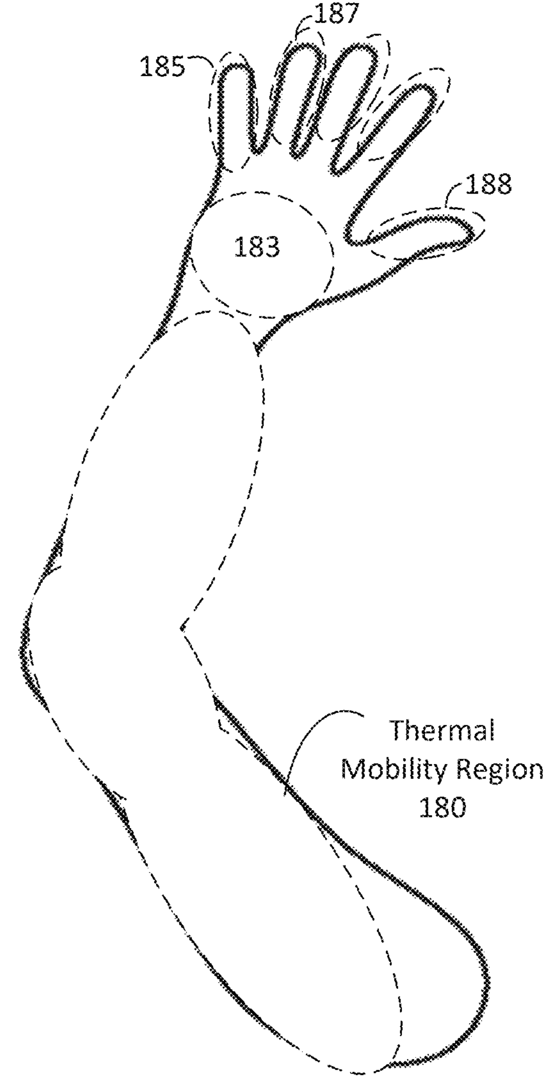
FIG. 1D shows a set of thermal mobility regions and their respective anatomy boundaries.

FIG. 1D shows a set of thermal mobility regions and their respective anatomy boundaries. Thermal mobility region 180 extends from a shoulder, and extends along a forearm. Thermal mobility region 183 includes a palm. Generally, heat sensations generated by a thermal actuator 110 on a palm (thermal mobility region 183) are not conveyable to fingers or fingertips. In other words, an anatomy boundary (not shown) exists between the palm and the fingers. Within the hand different thermal mobility regions, 185, 187, and 188 exist for different portions of the fingers and thumb.

Specific delineations indicated in FIG. 1D are subject to change and may vary among different sets of people. In general, there are anatomy-based restrictions on the distance and regions within which temperature sensations are able to be perceptually shifted from a region at which thermal energy is generated.

Figure 2A:
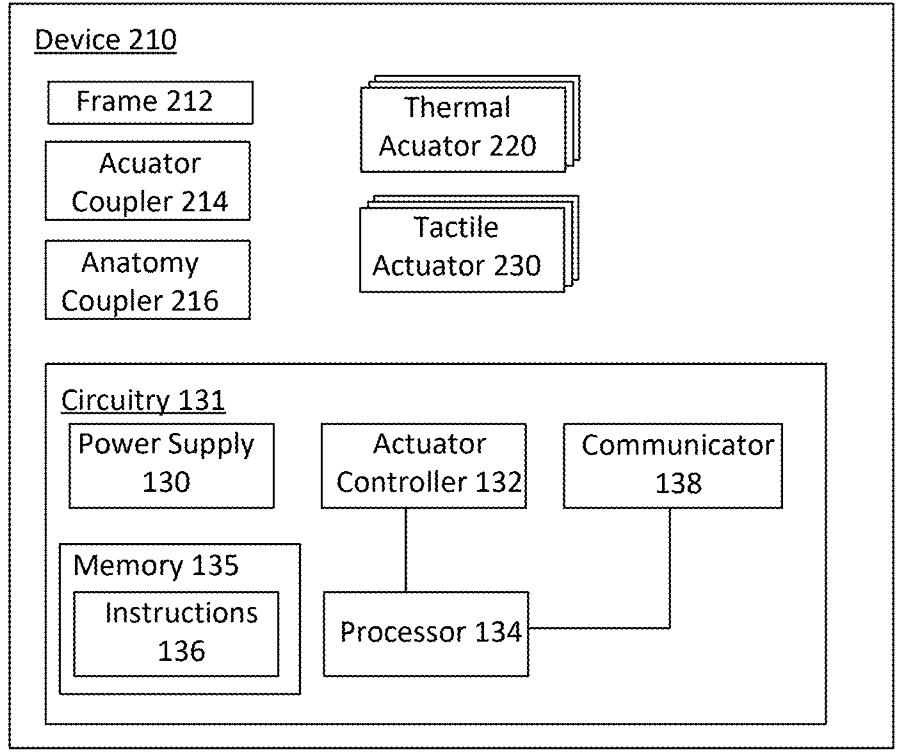
FIG. 2A shows a schematic diagram of a device able to perform thermal referral and sense masking.

FIG. 2A shows a schematic diagram of a device 210 able to perform thermal referral and sense masking. The device 210 can be a wearable device, a peripheral, a medical rehabilitation aid, thermal regulated clothing, and other such artifacts. Device 210 includes a frame 212, which establishes a relative position of the various actuators 220 and 230 in regard to relative position of the human body (e.g., human anatomy area 150). The frame 212 can be a solid structure or can include a flexible fabric depending on use case.

Device 210 can include a set of actuator couplers 214 for coupling the various actuators 220 and 230 to frame 212. The coupler 214 can be a detachable coupler or can be one for which the actuators 220 and 230 are not able to be removed. Detachable couplers are beneficial when the actuators 220 and 230 are expressly replaceable, updatable, or are separately sold from device 210.

The anatomy coupler 216 is a component or set of components for device 210 that is used for affixation to a portion of a human body. Anatomy coupler 216 can include a stretchable strap, a VELCRO attachment, a vest, and the like. Anatomy coupler 216 may be part of the frame 212.

Thermal actuator 220 is an instance of thermal actuator 110. Tactile actuator 230 is an instance of tactical actuator 120. Device 210 can include one or more thermal actuators 220 and can include one or more tactile actuators 230. At least one thermal actuator 220 should be included in each thermal mobility region within which sensations of thermal energy are to be perceived.

Device 210 includes the circuitry 131, power supply 130, actuator controller 132, processor 134, memory 135, instructions 136, and communicator 138 as previously described with reference to FIG. 1A.

In one use case, the frame 212 is a vest (see FIG. 4A), which includes rows and columns of thermal actuators 220 and tactile actuators 230. In another use case (see FIG. 5A), frame 212 can include a set of arm straps (or a sleave) that affixes thermal actuator 220 and a set of tactile actuators 230 to a wearer's forearm. In another use case (See FIG. 6A), the frame 212 includes a set of rings or other accessory for attaching the thermal actuators 220 and the tactile actuators 230 to a wearer's fingers/palm. In another embodiment, the frame 212 includes a set of gloves, which allow a wearer to feel a sensation of temperature via their hands when interfacing with an extended reality application.

Figure 2B:
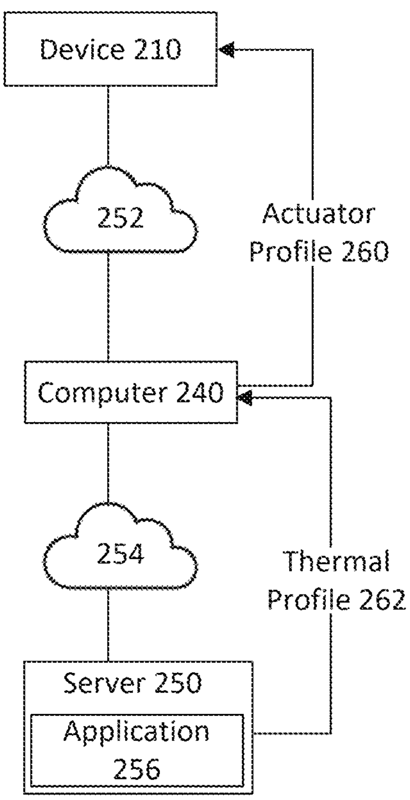
FIG. 2B shows a computing platform that includes a device, which relies on thermal referral and sense masking.

FIG. 2B shows a computing platform that includes device 210, which relies on thermal referral and sense masking. Device 210 is a peripheral outputting thermal sensations to a user. Device 210 can be connected to a computer 240 through a network 252 (e.g., BLUETOOTH) or a communication cable (e.g., USB). The computer 240 may include a personal computer, an entertainment or gaming console, a tablet, a virtual reality device, and the like. The computer 240 can locally execute software applications for which thermal sensation output is provided. Computer 240 may be connected to a network 254 (e.g., the internet or an intranet) to which a remote server 250 executes application 256 for which device 210 provides thermal sensations as output. In embodiments, device 210 and computer 240 can be an integrated device, such as an internet connected VR headset with thermal output attachments.

Timing for thermal sensation output is often significant, especially when the thermal output interacts with an extended reality, virtual reality, or augmented reality application. Server 250 based applications often involve multiple players interacting with each other, in which case low latency in providing thermal sensations can be especially important. In embodiments, application 256 can generate thermal profile 262, which defines regions and timing for perceiving thermal sensations. The thermal profile 262 can be device 210 independent. Device dependent actuator profile 260 can be generated from the thermal profile 262.

Figure 3:
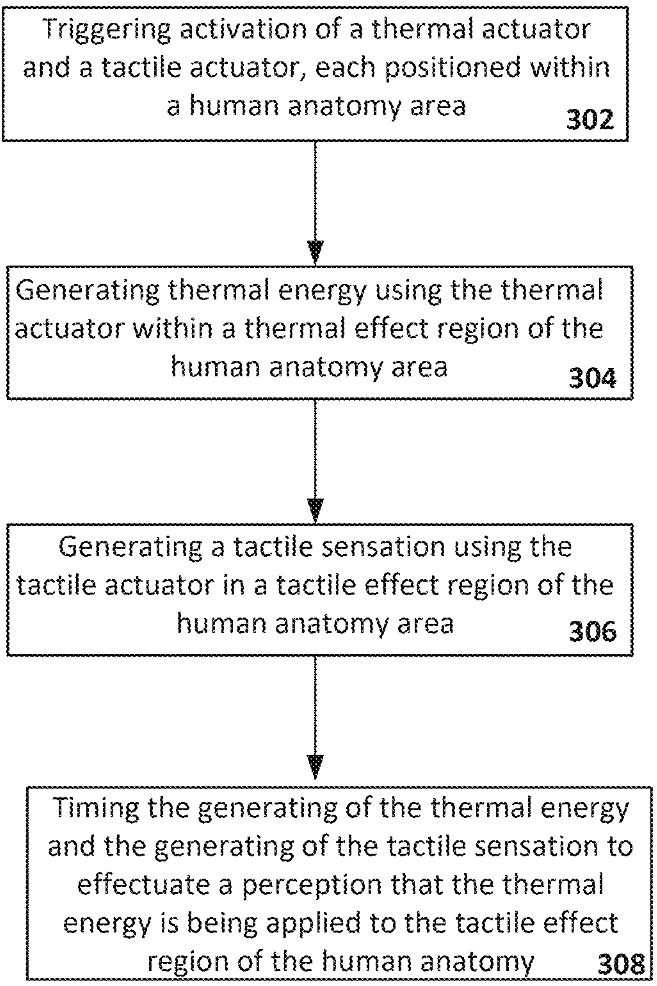
FIG. 3 shows a flow chart of a method for producing thermal sensations perceived as originating in a region not receiving thermal energy.

FIG. 3 shows a flow chart of a method for producing thermal sensations perceived as originating in a region not receiving thermal energy. The method can begin in step 302 with triggering activation of a thermal actuator 110 and a tactical actuator 120. Each of the thermal actuator 110 and the tactical actuator 120 can be positioned within a human anatomy area 150. In step 304, the thermal actuator 110 generates thermal energy within a thermal effect region 140 of the human anatomy area 150. In step 306, the tactile actuator 120 can generate a tactile sensation using in a tactile effect region 142 of the human anatomy area 150. The tactile sensation can be a tactile force. In some embodiments, device 210 can generate the thermal energy and the tactile sensation. In step 308, a timing of the generating of the thermal energy and the generating of the tactile sensation can effectuate a perception that the thermal energy is being applied to the tactile effect region 142 of the human anatomy.

The timing and the generating can concurrently activate the thermal actuator 110 and the tactile actuator 120 that displaces a location at which thermal sensations are perceived through thermal referral. Further, the timing and the generating can utilize sense masking so that thermal sensations from the thermal actuator are not perceived as occurring within the thermal effect region.

In certain embodiments, thermal profile 102 is received from system 104. The thermal profile 102 defines a location and a timing with which thermal sensations are to be perceived within the human anatomy area 150. The thermal profile 102 is device independent. Further, an actuator profile is generated that is device dependent and that is consistent with the thermal profile. Timing and quantifying the generating of the thermal energy and the tactile sensation is in accordance with the actuator profile.

A communication for generating thermal output can be received from a running application in some instances. The running application can be an extended reality application and the thermal actuator 110 and the tactile actuator 120 can be components of a peripheral integrated with the extended reality application for receiving thermal sensation output in accordance with events time synchronized with the extended reality application.

In some embodiments, a second tactile sensation is generated in a second tactile effect region using a second tactile actuator, which is active while the tactile actuator and the thermal actuator are active to effectuate a perception that the thermal energy is being applied to a region that is a sum of the tactile effect region and the second tactile effect region. (see FIG. 1B) In some embodiments, a second tactile sensation is generated in a second tactile effect region using a second tactile actuator, which is active after the tactile actuator is active. Thermal actuator is active for a duration that either the tactile actuator is active and that the second tactile actuator is active to effectuate a perception that the thermal energy moves from the tactile effect region to the second tactile effect region. (See FIG. 1C)

Vest/Torso Embodiment/Experiment

In one use case, device 210 is a vest with vibrotactile actuators and thermal actuators. The vest is designed to fit around a human torso and to produce thermophysiological temperature sensations across a wearer's back. Actuators in the vest are positioned as a grid having four rows of vibrotactile actuators with four vibrotactile actuators per row. A thermal actuator is positioned in a center of each row. The vest was used in a set of experiments that determined multiple actuators are able to be paired to a single thermal actuator. The vest is one instance of a wearable system consistent with the disclosure. Other arrangements/embodiments are contemplated.

The vest is a modification of a commercial haptic vest (e.g., TACTOT DK3, BHAPTICS) having forty (40) individually controlled ERM vibrotactile actuators (20 for front and 20 for back). The vest has a length of 22.5 to 24 inches and a body circumference of 25-50 inches, with a total weight of 1.7 kg. Four thermal actuators (THERMOREAL, TEGWAY) are included, one-per-row between the second and the third columns of the vibrotactile array. The thermal actuator is a flexible thermoelectric device with a size of 5.99 cm (length)×3.35 cm (width)×1.11 cm (height) and a weight of 34.5 g, having a structure with a curved surface on the top and the bottom. A heat sink is attached to the opposite side of the release sheet in contact with the skin. A fixed current of 1.34 A is applied, and the duty cycle ratio controls the output intensity. The thermal actuator can be activated using either a power supply or a Lithium-ion battery. The Lithium-ion battery (MP103 450P) used for the photographed vest has a rated voltage of 3.7V, a capacity of 2000 mAh, and a discharge rate of 1 C. A current of 1.34 A can be provided continuously for about 86 minutes with a single charge. Performance of the thermal actuator was tested when powered with a Lithium-ion battery or a digital power supply (NAVITECH NP6005). No performance difference resulted from whether power was provided via battery or power supply.

Figure 4A:
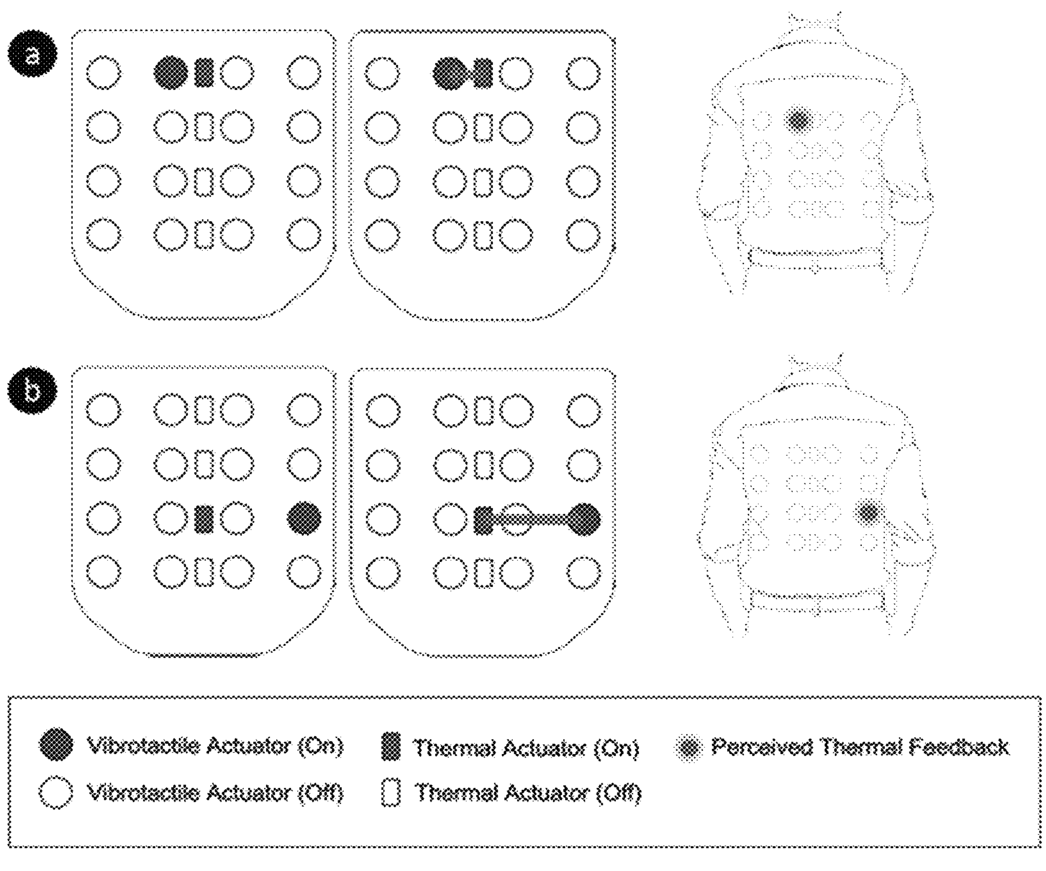
FIG. 4A is a diagram highlighting aspects of the thermal illusion created via thermal referral and sense masking.

FIG. 4A is a diagram highlighting aspects of the thermal illusion created via thermal referral and sense masking. As shown, an active (e.g., ON state) vibrotactile actuator is illustrated as a filled in blue circle. An inactive (e.g., OFF state) vibrotactile actuator is illustrated as a white circle. An active (e.g., ON state) thermal actuator is illustrated as a filled in red rectangle and an inactive (e.g., OFF state) thermal actuator is illustrated as a white rectangle. Perceived heat is indicated as a red circle.

As shown in section (a), when a top row thermal actuator and a second column, first row tactile actuator are active, a wearer perceives the thermal energy (generated by the thermal actuator) as coming from a first row, second column (e.g., a region where the tactile force was applied). As shown in section (b), when the thermal actuator of the third row and a tactile actuator of the third row, forth column are both active, a wearer perceives the thermal energy as coming from a location of the third row, forth column (e.g., a region where the tactile force was applied). In the sections of FIG. 4A, thermal referral (moving heat sensation) and sense masking (user not perceiving heat at the generated location) are both evident.

Figure 4B:
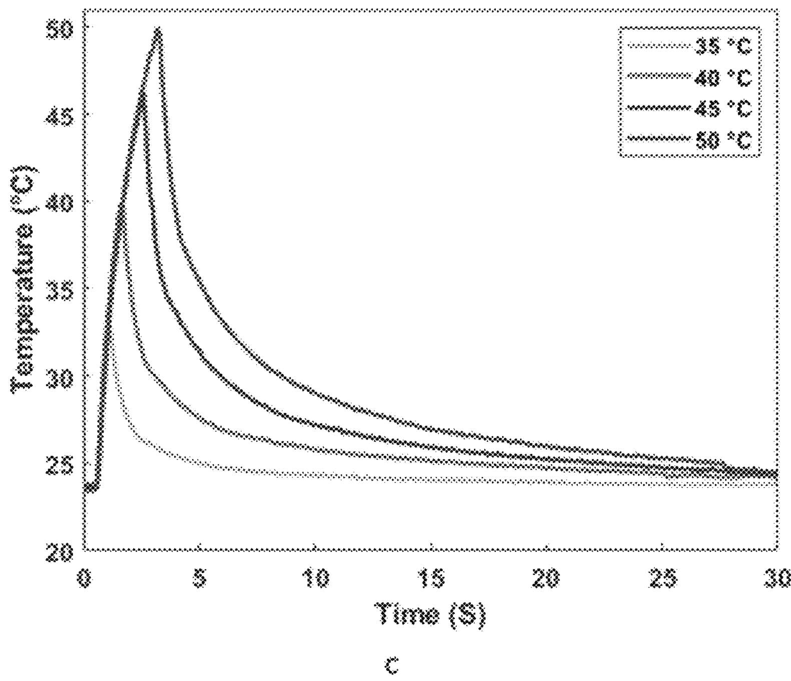
FIG. 4B shows the characteristics of the thermal component of the thermal actuator used in the vest embodiment.

FIG. 4B shows the characteristics of the thermal component of the thermal actuator used in the vest embodiment. The thermal component can provide heat sensations, ranging from room temperature (23.5° C.) to 50° C. The thermal component can reach a certain temperature level in a short time (less than 3 seconds), after which approximately 15 seconds is needed to return to room temperature. Higher temperature values or setting for the thermal actuator increase latency associated with thermal delay and thermal persistence as evident from the chart of FIG. 4B. Latency values are significant with regard to time synchronizing thermal perception outputs with an events occurring in extended reality application, simulator, or other such system. Because temperature sensation and location is largely controllable using a tactile actuator 120, temperature based latency is able to be reduced to effectively that of the tactile actuator 120, which is minimal. Thus, application of thermal referral and sense masking permits perceived temperatures to be conveyed with reasonable latency (e.g., commercially viable latency), which is not otherwise possible.

In generating test scenarios for the vest experiment, the thermal intensity, by default, was set to 90%, which generates an average of 50° C. on the surface of the thermal actuator and 40° C. with cloth, ensuring perceivable and comfortable thermal sensation to the participant.

Figure 4C:
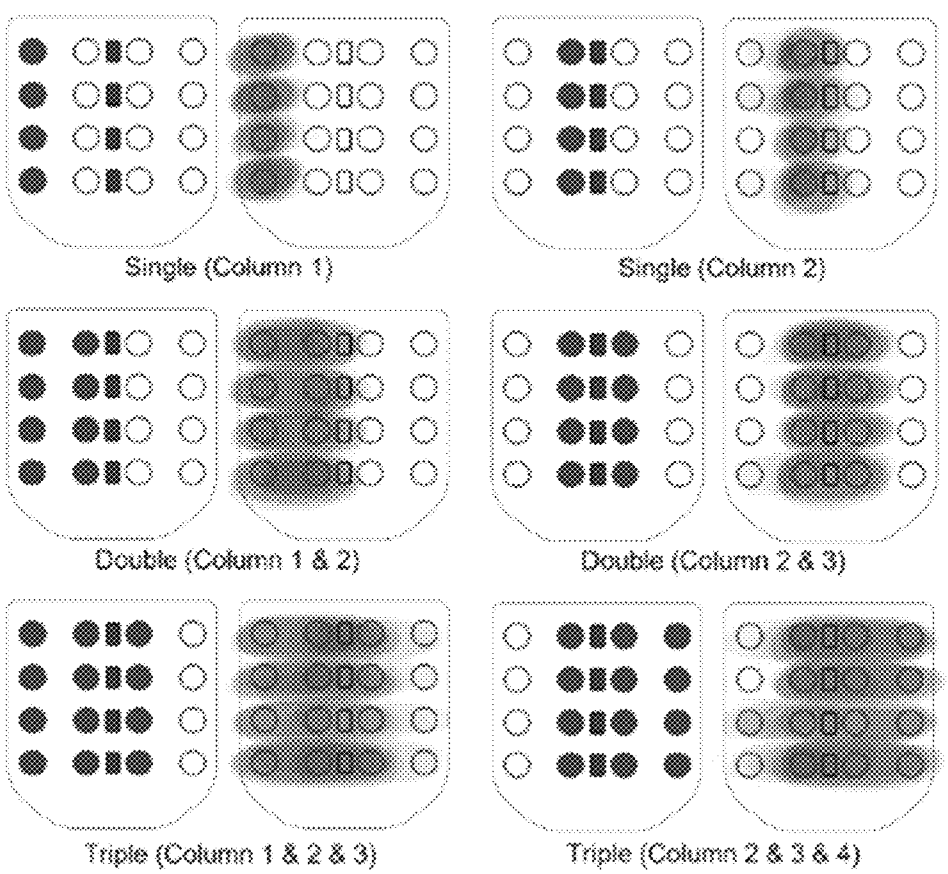
FIGS. 4C and 4D show results of an experiment proving thermal referral and sense making using the vest use case.
Figure 4D:
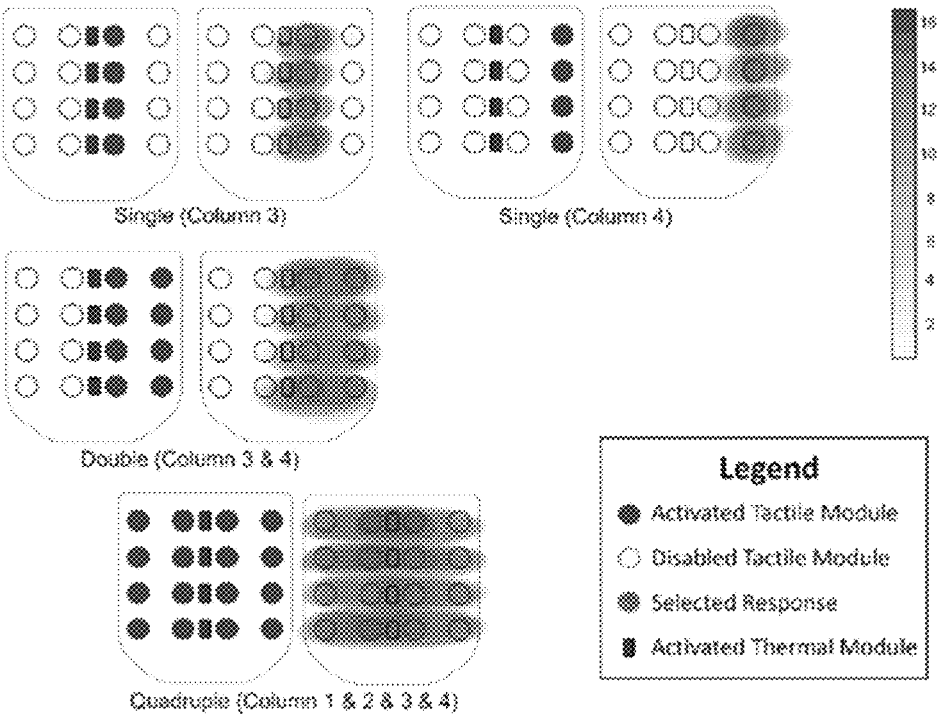

FIGS. 4C and 4D show results of an experiment proving thermal referral and sense making using the vest. The experiment involved sixteen participants, ranging from 22 and 34 years old (7 females, mean age=29.5 years old; SD=2.83). All participants wore a light top and had no problems perceiving tactile or thermal sensations on their backs. Conventions used are similar to those of FIG. 4B (e.g., white shows OFF state, blue circle ON state for tactile actuator; red square for ON state of thermal actuator; red circle for perceived thermal sensation).

When a thermal actuator for each row is active, while a first column tactile actuator is active for each row, a wearer perceives thermal energy at the first column for each row (See illustrations of FIG. 4C labeled Single—Column 1). Similarly, when the second column tactical actuator is active for each row, a wearer perceives thermal energy at the second column for each row (see illustrations of FIG. 4C labeled Single—Column 2). When the first two columns of actuators are active, a wearer perceives thermal energy at the first and second columns for each row (see Double—Column 1&2). When the middle two columns of actuators are active, a wearer perceives thermal energy at the second and third columns for each row (See Double—Column 2&3). When the first three columns of tactile actuators are active, a wearer perceives thermal energy at the first, second, and third columns for each row (See Triple—Columns 1&2&3). When the last three columns of tactile actuators are active, a wearer perceives thermal energy at the second, third, and fourth columns for each row (See Triple—Columns 2&3&4).

As shown by FIG. 4D, activation of tactile actuators in the third and forth column positions results in perceived thermal energy in the third and forth columns (See Single—Column 3; Single—Column 4). Activating all tactile actuators, results in perceived thermal energy in the first, second, third, and forth columns (See Quadruple—Column 1&2&3&4).

Generally, FIGS. 4C and 4D confirm/prove temperature sensations can be received in a location within which a tactile force is exerted and may not be perceived in a region where thermal energy is actually emitted.

Figure 4E:
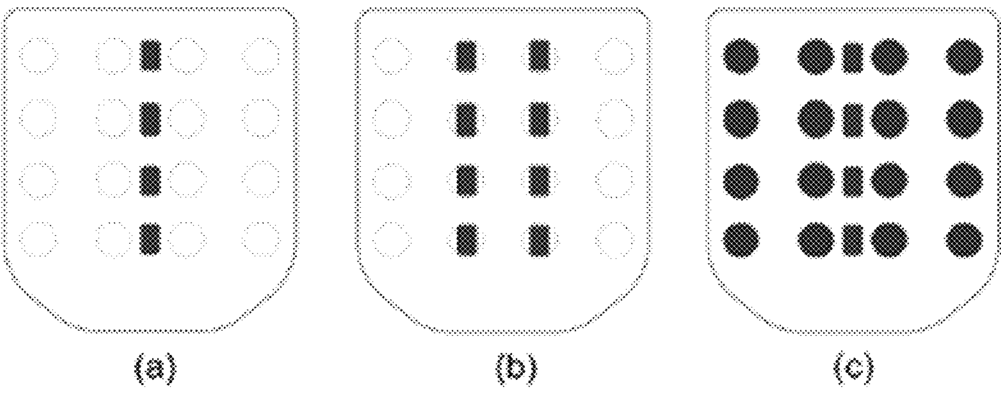
FIG. 4E shows a set of vest setups used to generate perceived thermal energy.

FIG. 4E shows a set of vest setups used to generate perceived thermal energy. In section (a), a set of centrally positioned thermal actuators are positioned in a single column (one per row). Per the legends of FIGS. 4F and 4G this arrangement is referred to as "ThermalOnly(4)". In section (b), a set of centrally positioned thermal actuators are positioned in two columns (two per row). Per the legends of FIGS. 4F and 4G this arrangement is referred to as "ThermalOnly(8)". In section (c), a set of centrally positioned thermal actuators are positioned in a column along with tactile actuators. Per the legends of FIGS. 4F and 4G this arrangement is referred to as "Thermal Tactile(4)".

Figure 4F:
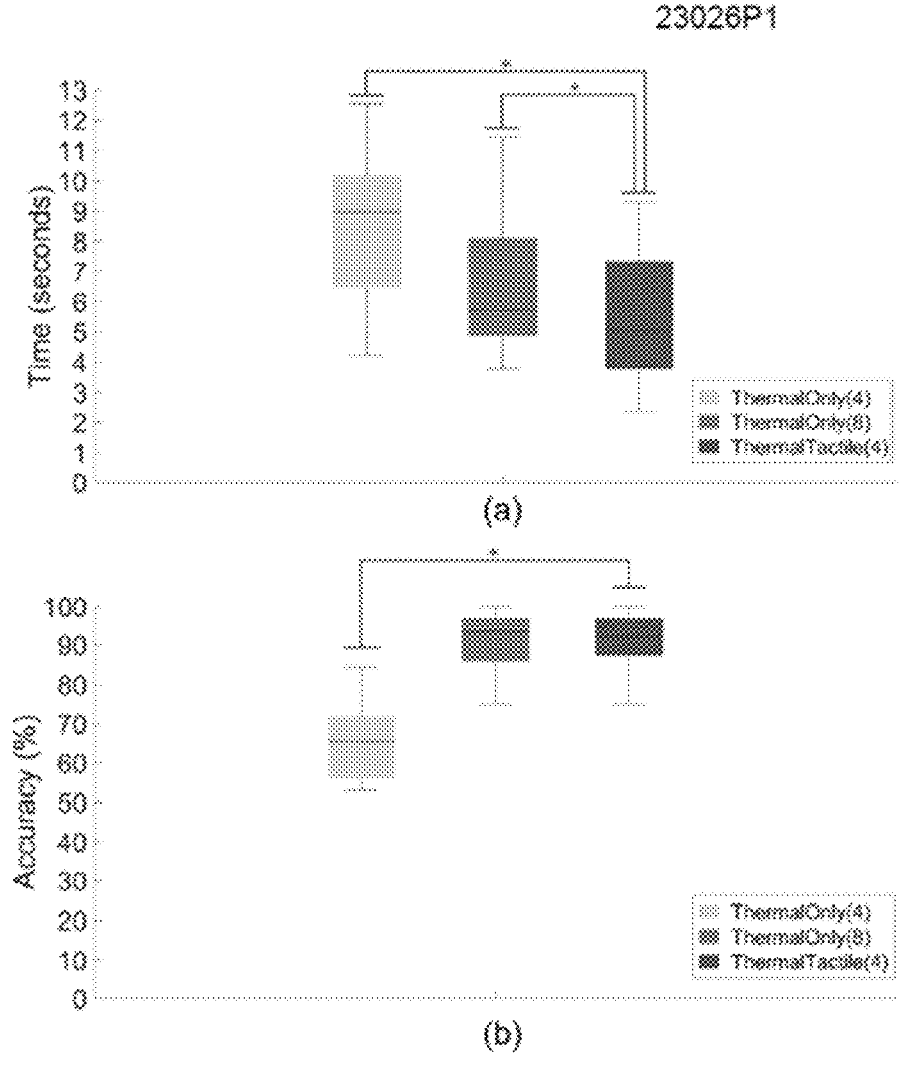
FIG. 4F shows performance of conditions in terms of mean task time and mean accuracy.

As shown by FIG. 4F second (a), a time to effectuate a perceived thermal energy perception is greatest for the ThermalOnly(4) configuration. The ThermalTactile(4) arrangement requires less time to be perceived than the ThermalOnly(8) arrangement that performed in the middle. Second (b) shows that the ThermalTactile(4) arrangement was more accurate than either of the other two arrangements.

More specifically, FIG. 4F shows performance of conditions in terms of mean task time and mean accuracy. The mean task completion time T was calculated by averaging the time between visual feedback provided and when participants noticed thermal sensation for all 32 trials in each condition. As shown in section (a) of FIG. 4F, T was 8.4, 6.5, and 5.4 seconds for ThermalOnly(4), ThermalOnly(8), and ThermoTactile(4), respectively. Kolmogorov-Smirnov (K-S) test was performed, and normality of the data was confirmed. Levene test was conducted on T, to confirmed the homogeneity of variances (p=0.6245). A one-way ANOVA with repeated measures and a post-hoc Tukey test revealed that ThermoTactile(4) had a significant difference from both ThermalOnly(4) (p=0.0009) and ThermalOnly(8) (p=0.00008). These results indicate that thermal sensations can be identified faster with an approach that combines thermal actuators and tactile actuators than an approach that relies only on thermal actuators.

The mean accuracy A was calculated as the percentage of "yes" responses out of all trials in to a follow-up question, asking whether the position of visual feedback matched the position of thermal sensation participants perceived. In section (b) of FIG. 4F, A was 64.1%, 91.0%, and 91.7% for ThermalOnly(4), ThermalOnly(8), and ThermoTactile(4), respectively. The normality of the data for A was confirmed using the K-S test. The homogeneity of variances among the input data was confirmed by the Levene test (p=0.09267). A one-way ANOVA showed that ThermoTactile(4) had a significant difference on ThermalOnly(4) (p=0.0003) for A, but no significant effect was found between ThermoTactile(4) and ThermalOnly(8).

Figure 4G:
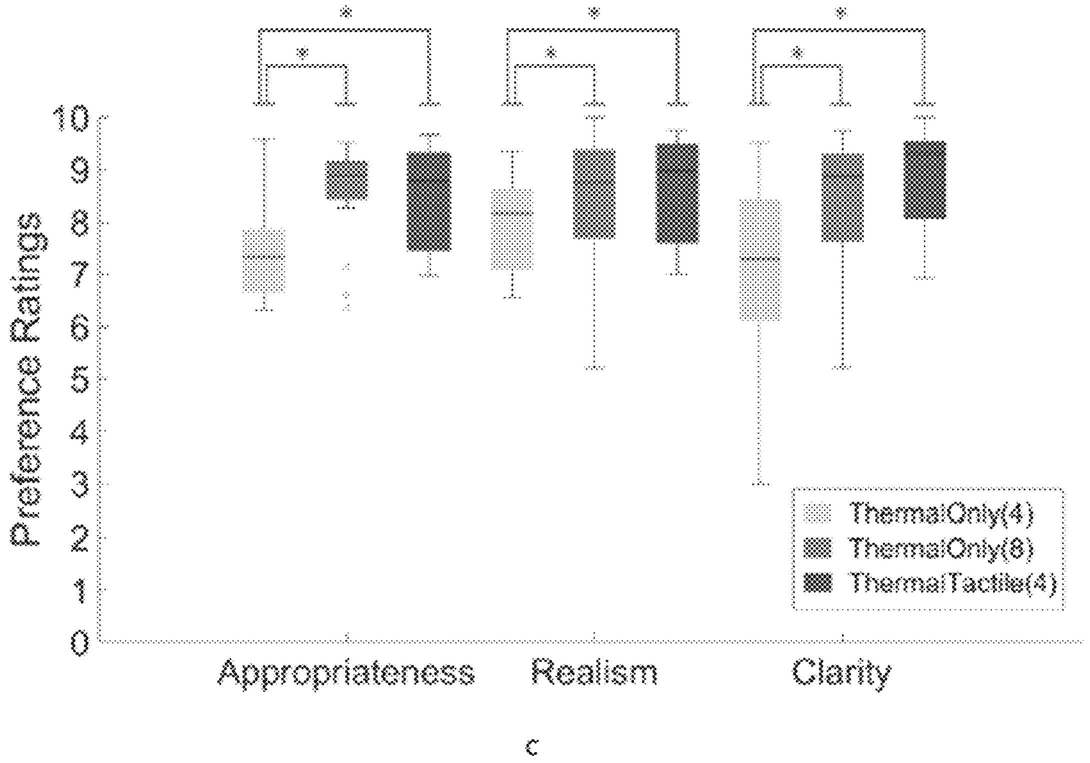
FIG. 4G shows charts evaluating preference ratings for the different arrangements of vests.

FIG. 4G shows charts evaluating preference ratings for the different arrangements of vests. Subjective measures (e.g., appropriateness, realism, and clarity) show that participants rated ThermalOnly(8) (8.5, SD=0.9) and ThermoTactile(4) (8.5, SD=0.9) to be equally appropriate for the visual feedback, but lower in ThermalOnly(4) (7.2, SD=1.2). Users perceived ThermoTactile(4) (8.6, SD=0.9) to be more realistic than ThermalOnly(8) (8.3, SD=1.3) and ThermalOnly(4) (7.4, SD=1.8). Similarly, participants perceived ThermoTactile(4) (8.8, SD=1.0) to be more clear than ThermalOnly(8) (8.3, SD=1.3) and ThermalOnly(4) (7.1, SD=1.7). Kolmogorov-Smirnov (K-S) test was performed to confirm the normality of the data. A Levene test on the collected data showed the homogeneity of variances among them for all three measures (p=0.7666 for Appropriateness; p=0.3168 for Realism; and p=0.2252 for Clarity). A one-way ANOVA with repeated measures revealed a significant effect with a large effect size of conditions on all three subjective measures, Appropriateness (p=0.0013, $\eta 2=0.24$), Realism (p=0.0028, $\eta 2=0.17$), and Clarity (p=0.0032, $\eta 2=0.21$). Further analysis using Tukey test revealed significant differences between ThermalOnly(4) and the other two conditions ($p<0.001$) while ThermoTactile(4) and ThermalOnly (8) were not found to be significantly different (p=0.9 for Appropriateness; p=0.8 for Realism; and p=0.5 for Clarity), showing higher preferences in both ThermoTactile(4) and ThermalOnly(8) conditions over ThermalOnly(4).

Forearm Embodiment/Experiment

FIG. 5A through 5I related to a set of experiments conducted using thermal and vibrotactile actuators to investigate the nature of thermal masking on human arms. The first experiment investigates the effects of different temperatures on sense masking. The results of the first experiment show a higher percentage of thermal masking occurs in warm than hot or cold conditions. The second experiment examines how far the thermal masking can be perceived. The results show that masking can reach up to 24 cm from the thermal site (e.g., the arm). As noted (see FIG. 1C), the distances of thermal referral and masking can be dependent upon the human anatomy (e.g., thermal mobility regions and anatomy boundaries). The third experiment explores the three-dimensional nature of thermal mobility regions by placing the tactile actuators on an arm opposite to the placement of a thermal actuator. The results of the third experiment confirm that thermal referral/sense masking can reach the other side of the arm.

In some embodiments, thermal perception has been found to be a fundamental aspect of sensory perception that allows humans to perceive warmth and coldness when their thermoreceptors respond to a stimulus above or below the skin temperature. In contrast, vibrotactile information is detected by mechanoreceptors, triggering the human brain's somatosensory cortex. Thermal sensations are perceived through the warm or cold thermoreceptors found in the epidermis and dermis skin layers. These sensory signals are then transmitted to the brain and processed within the insular cortex. Warm receptors are sparsely distributed on our skin in comparison to cold receptors. This discrepancy in receptor density is responsible for the heightened sensitivity of human skin to cold temperatures rather than warm ones.

In certain embodiments, thermal thresholds for detecting warmth and heat-induced pain span from 30° C. to 34° C. and 39° C. to 50° C., respectively, while those for cold and cold-pain detection range from 12° C. to 31° C., 0° C. to 28° C. The response time of thermoreceptors falls within the range of 0.5 to 2 seconds, and it is typically slower compared to mechanoreceptors, which typically respond within a few milliseconds. Thus, there are physiological reasons for thermal delay with regards to thermal sensations compared to tactile delays. These physiological delays can be adjusted for in actuator profiles (See FIGS. 1B and 1C) just as delays for effective actuator activation can be accounted for.

In FIG. 5A through 5I, four referral states: No Referral, Weak Referral, Strong Referral, and Masking are utilized as dependent variables to investigate several aspects of thermal referral and sense masking on different sets of users. Thermal referral demonstrates apparent masking effects that exhibit non-uniform thermal redistribution, yielding different thermal perceptions at both thermal and tactile locations.

No Referral refers to a thermal sensation that is only perceived at a thermal location. With reference to FIG. 1A, in a No Referral scenario, a perceived thermal sensation is from within thermal effect region 140.

Weak Referral refers to thermal sensations perceived at both thermal and tactile locations, with weaker thermal sensation at the tactile location. With reference to FIG. 1A, a Weak Referral situation results in temperature sensations being sensed strongly within thermal effect region 140 and more weakly within tactile effect region 142.

Strong Referral refers to thermal sensation perceived at both thermal and tactile locations, with a stronger thermal sensation at the tactile location. With reference to FIG. 1A, a Strong Referral situation results in temperature sensations being sensed strongly within tactile effect region 142 and more weakly within thermal effect region 140.

Figure 5A:
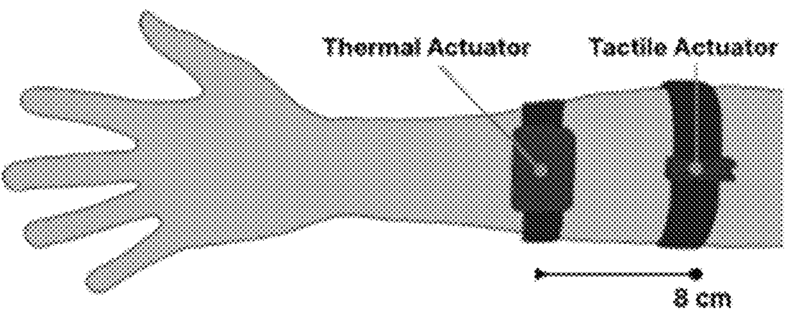
FIG. 5A illustrates a thermal actuator and a tactile actuator being placed on a forearm.

FIG. 5A illustrates a thermal actuator 110 and a tactile actuator 120 being placed on a forearm. A general distance between the thermal actuator 110 and tactile actuator 120 for the first experiment was approximately 8 cm.

In the first experiment, The skin of the forearm as a target region due to its sparse distribution of thermal receptors in its skin. The thermal actuator 110 was placed at the central location on the ventral side of the forearm to deliver thermal stimulus.

A Peltier-based thermal actuator with a curved shape surface (TEGWAY THERMOREAL) was used. The Peltier dimension of the thermal actuator was 30 mm (width)×40 mm (height)×2.3 mm (depth). The bending radius of the Peltier is set to 7.5 mm for a better fit of the skin surface. The maximum temperature difference across the Peltier is 64° C. under a current of 6 A and voltage of 5.7 V. The thermal actuator can reach the target temperatures in the current studies with a short response time of approximately 1 second. An ERM vibrotactile actuator (TATOKO B07-Q1ZV4MJ) to generate tactile stimuli onto the forearm. The vibrotactile actuator has a coin shape with a diameter of 10 mm with a depth of 3 mm. For warm and hot temperatures 10 mN (2.68V) with 175 Hz was selected. For cool and cold temperatures, 14 mN (3.19V) with 225 Hz was selected. Vibration intensities of 10 mN and 14 mN achieved the highest probability of thermal masking for warm and cool conditions, respectively. These parameters are within the Pacinian corpuscle detection range that can achieve a guaranteed perception of the vibrotactile stimulus and showed the highest probability of thermal referral and masking.

Adjustable VELCRO straps were used to fasten the thermal and vibrotactile actuators on the forearm. A 3D-printed structure was used to attach the vibrotactile actuator and hold the strap, ensuring tight contact with the skin. Both thermal and vibrotactile actuators were powered by a programmable digital power supply (KORAD KD6005P). The power supply was controlled through the serial port and operated under constant voltage mode as all actuators functioned by the input voltage.

Figure 5B:
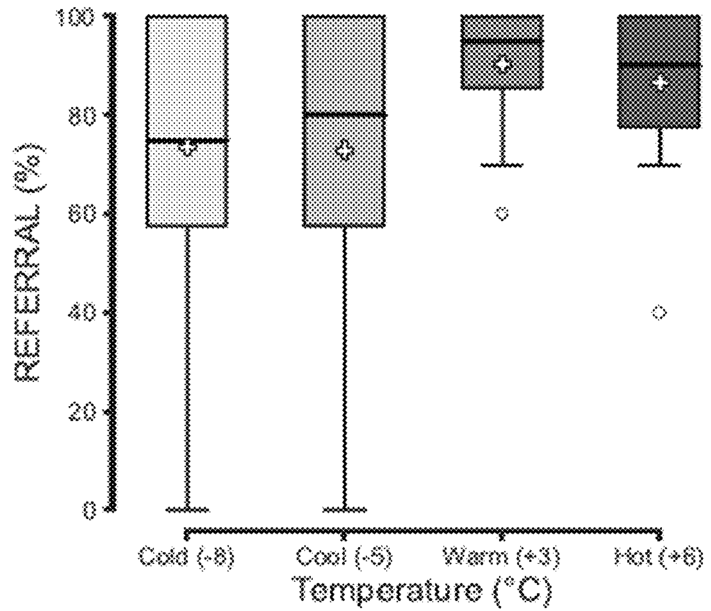
FIG. 5B shows the occurrence of a rate of thermal referral in four temperature conditions.

FIG. 5B shows an occurrence of a rate of thermal referral in four temperature conditions. In FIG. 5B, thermal referral includes Weak Referral, Strong Referral, and Masking as defined above. The overall mean of thermal referral was 80.8%, showing a uniformly high referral rate with all participants. The warm condition showed the highest mean rate of thermal referral (90.4%). The mean thermal detection rate was 99.1%.

Figure 5C:
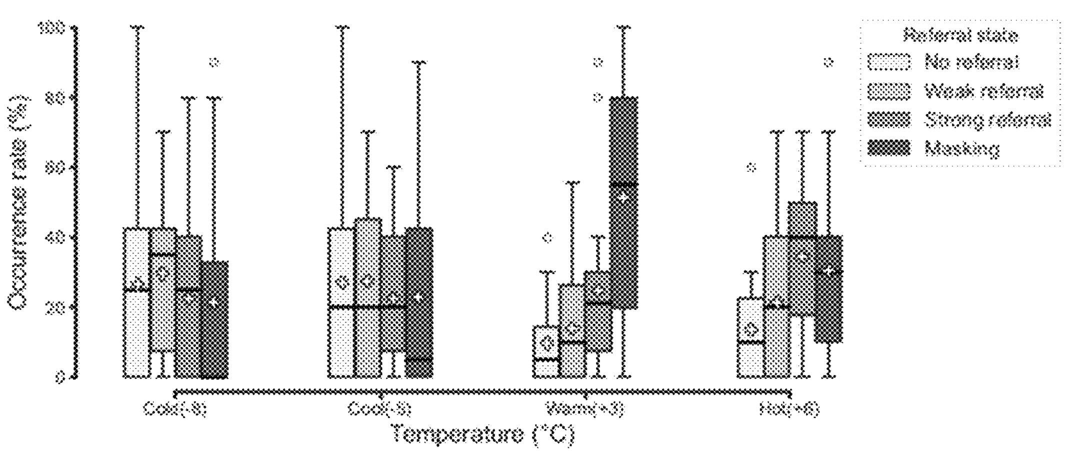
FIG. 5C shows the breakdown of thermal referral and occurrence rates of No Referral, Weak Referral, Strong Referral, and Masking for each temperature condition.

FIG. 5C shows the breakdown of thermal referral and occurrence rates of No Referral, Weak Referral, Strong Referral, and Masking for each temperature condition. In cold and cool conditions, Weak Referral was presented most frequently, followed by Strong Referral and Masking. In warm conditions, the occurrence rate of Masking was the highest, followed by Strong Referral. In hot conditions, the occurrence rates of Strong Referral were higher than that of Masking. The results of FIG. 5C clearly show the variation of the thermal referral state at different temperatures.

To statistically analyze data of FIG. 5C, Repeated-Measures (RM) ANOVA with Greenhouse-Geisser corrections for sphericity violations and post-hoc t-tests with Bonferroni corrections were adopted.

From experiment one, warm temperatures are significantly more effective for Masking compared to cool and cold temperatures, possibility due to the greater abundance of cold receptors on our skin, which outnumber the warm receptors.

Figure 5D:
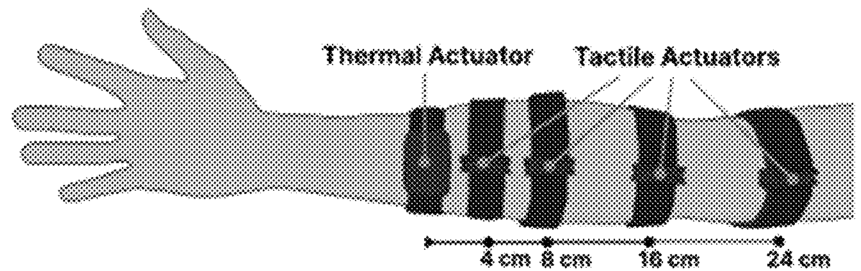
FIG. 5D illustrates a thermal actuator and a set of tactile actuators being placed on a forearm at different distances.

FIG. 5D illustrates a thermal actuator 110 and a set of tactile actuators 120 being placed on a forearm at different distances. Experiment two utilized an arrangement consistent with FIG. 5D to explore the effective distance range of thermal masking in the entire arm. The setup used for experiment two of FIG. 5D is consistent with that detailed for experiment one (see FIG. 5A).

Tactile actuators of FIG. 5D are placed in various locations with four distance levels of 4 cm, 8 cm, 16 cm, and 24 cm apart from the thermal actuator. Two independent variables, temperature and distance, are present in experiment two. Two temperature levels of cool (−5° C.) and warm (+3° C.) were selected based on the results from experiment one.

Four distance levels of 4 cm, 8 cm, 16 cm, and 24 cm were determined for short and long distances based on the average human arm length.

Figure 5E:
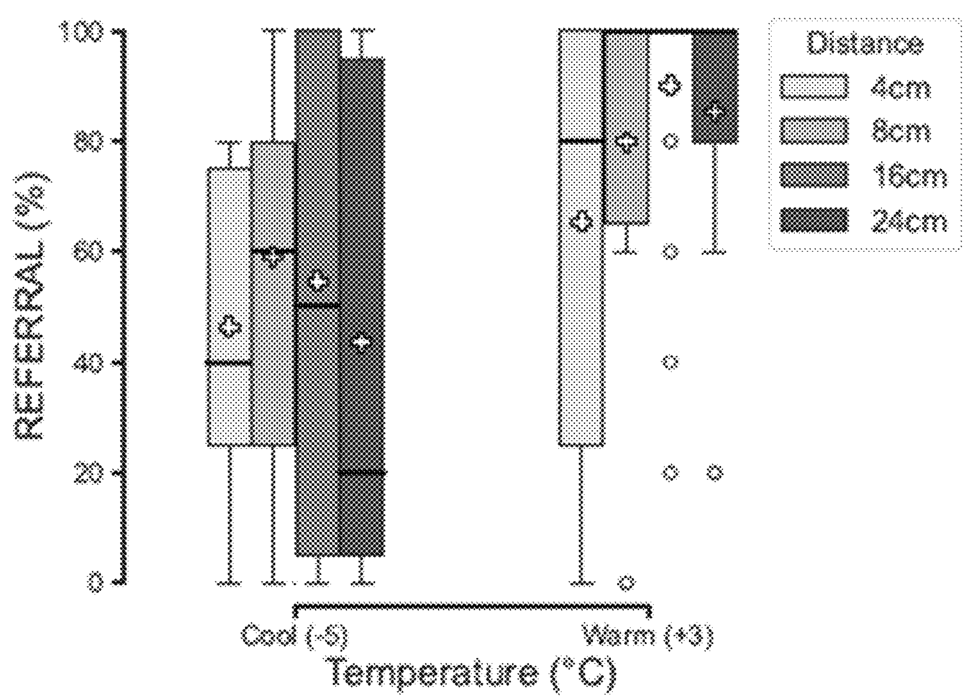
FIG. 5E shows a generally higher rate and lower variances with warm conditions than cool conditions over four distance levels.

FIG. 5E is a chart showing mean occurrence rates of thermal referral by two temperatures and four distances consistent with arrangements of FIG. 5D. FIG. 5E shows a generally higher rate and lower variances with warm conditions than cool conditions over four distance levels. The low occurrence rates of thermal referral were observed at the shortest distance (4 cm) at both temperatures. The mean occurrence rates of warm conditions were 90% and 85% at 16 cm and 24 cm, respectively, showing higher rates at long distances. The results indicate that the thermal referral could be reached to the upper arm with a higher chance. The mean thermal detection rate was 99.9%.

Two-way RM ANOVA for the temperature and distance variables was conducted for data analysis. Thermal referral at the warm condition led to a higher occurrence rate on the distances of 8 cm ($p<0.01$), 16 cm ($p<0.01$), and 24 cm ($p<0.001$). This result suggests that the warm temperature better generated thermal referral with the vibrotactile stimulus over long distances.

Figure 5F:
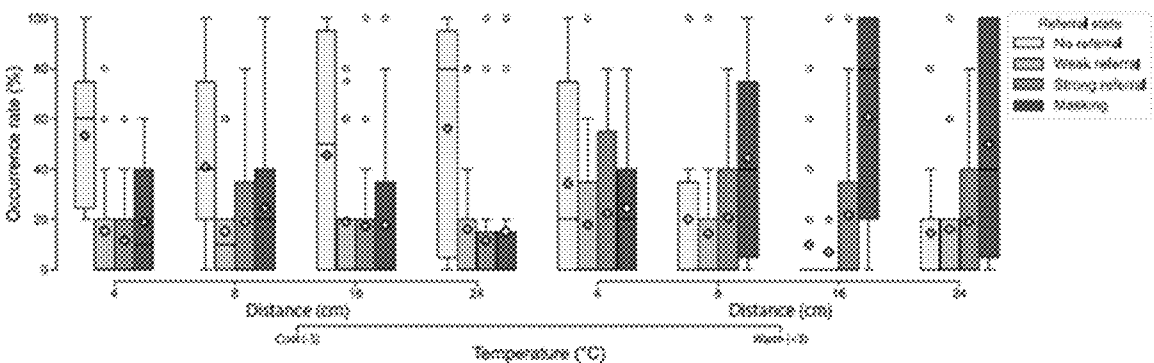
FIG. 5F illustrates individual occurrence rates of Weak Referral, Strong Referral, and Masking with regard to the arrangements of FIG. 5D.

FIG. 5F illustrates individual occurrence rates of Weak Referral, Strong Referral, and Masking with regard to the arrangements of FIG. 5D. As shown in FIG. 5F, Both Masking and Strong Referral accounted for high occurrence rates in warm conditions at all distances. The strength of the thermal illusion can be stronger than the actual thermal sensation from the thermal actuator when thermal referral occurred. The three referral states were analyzed using two-way RMANOVA with the temperature and distance variables.

Figure 5G:
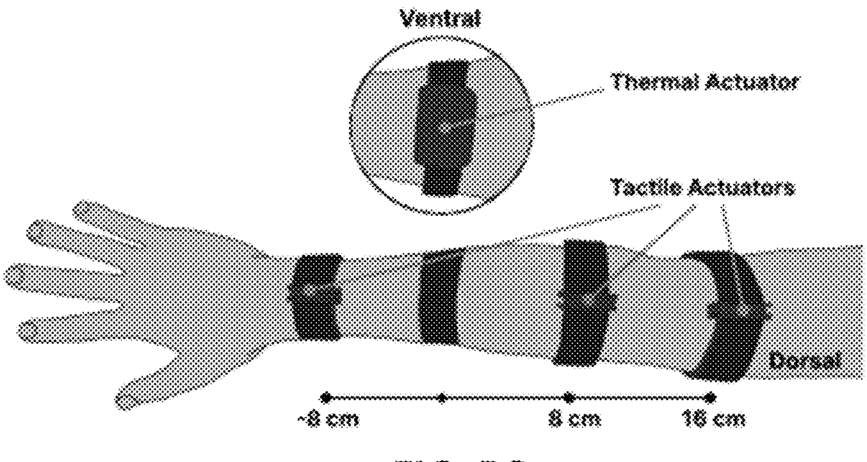
FIG. 5G illustrates a thermal actuator and a set of tactile actuators being placed on a forearm at different distances and on opposite sides.

FIG. 5G illustrates a thermal actuator 110 and a set of tactile actuators 120 being placed on a forearm at different distances and on opposite sides. Thermal referral states on both the dorsal and ventral sides of the forearm to observe the thermal redistribution over the arm in two different temperature conditions.

In experiment three of FIG. 5G, three tactile actuators were placed on the dorsal side of the forearm, while one thermal actuator was placed at the same location as in our previous two experiments (i.e., the middle of the forearm on the ventral side of the forearm). The locations of tactile actuators were-8 cm (8 cm toward the wrist), 8 cm, and 16 cm.

Figure 5H:
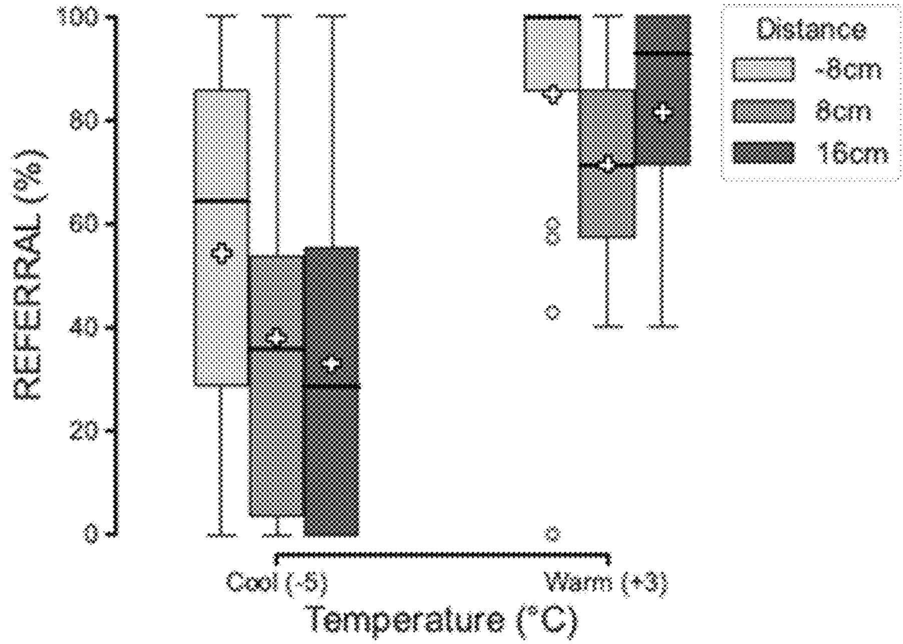
FIG. 5H shows mean occurrence rates of thermal referral at −8 cm, 8 cm, and 16 cm in accordance with the arrangements of FIG. 5G.

FIG. 5H shows mean occurrence rates of thermal referral at −8 cm, 8 cm, and 16 cm in accordance with the arrangements of FIG. 5G. In FIG. 5H, thermal referral rates for warm conditions were relatively higher than in cool conditions, indicating that the thermal referral is likely to occur at the opposite side of the forearm with a higher rate with warm temperatures.

A two-way RM ANOVA was conducted for statistical analysis. The distance of −8 cm had a significantly higher occurrence rate than the distance of 8 cm ($p<0.05$). The wrist is suitable for generating thermal referral on the dorsal side of the forearm.

Figure 5I:
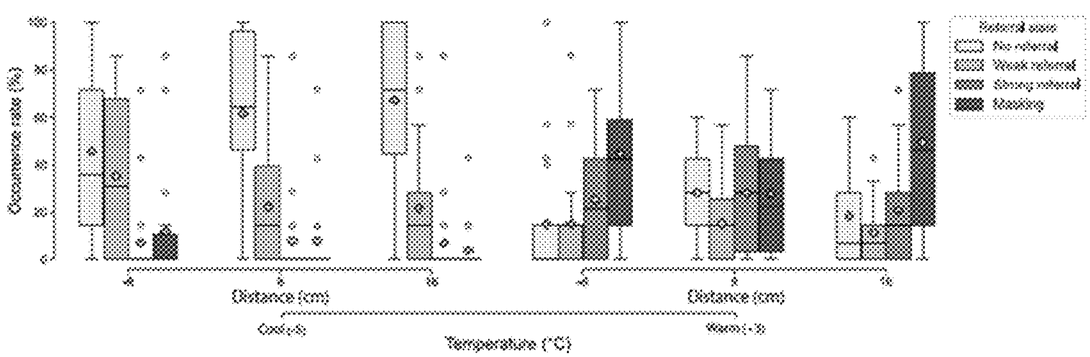
FIG. 5I shows the majority of No Referral and Weak Referral at all distance levels in cool conditions, indicating poor referral performance at the opposite side of the arm.

FIG. 5I shows the individual referral state for the arrangements of FIG. 5G. FIG. 5I shows the majority of No Referral and Weak Referral at all distance levels in cool conditions, indicating poor referral performance at the opposite side of the arm. In warm conditions, Strong Referral and Masking dominate.

The individual occurrence rate of Weak Referral, Strong Referral, and Masking was statistically analyzed with two-way RM ANOVA. Strong Referral shows a significant main effect on the temperature by the higher rates in warm condition. Masking had a significant main effect of temperature and interaction effect. FIG. 5I suggest that the forearm's opposite side (dorsal side) tended to have a similar trend in thermal referral and masking to the ventral side of the forearm: the higher occurrence rates on all distances with the warm temperatures.

Figure 5J:
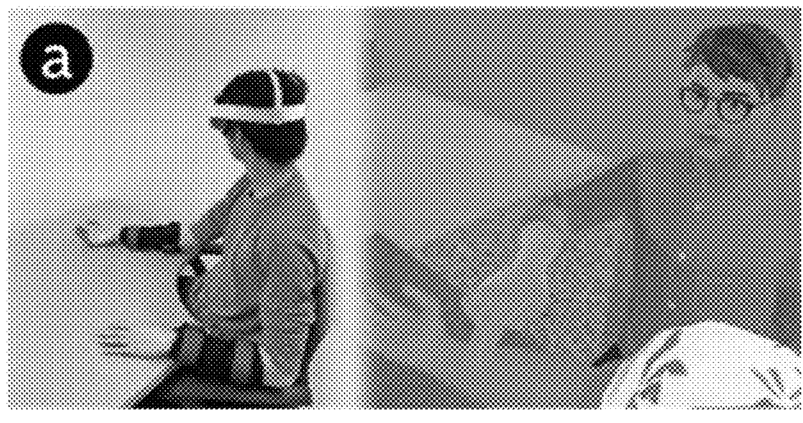
FIG. 5J shows a thermal sensation wearable used with a VR application.
Figure 5K:
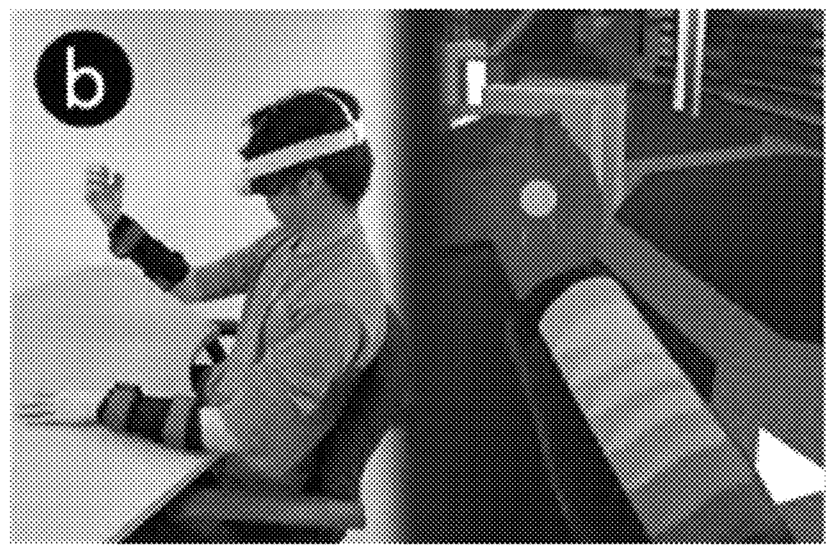
FIG. 5K shows a thermal sensation wearable used with a VR application to charge up a powered sleeve.
Figure 5L:
FIG. 5L shows a thermal sensation wearable used with a VR application to charge down a powered sleeve.

In an additional experiment illustrated by FIGS. 5J, 5K, and 5L, thermal movement along an arm is tested using a setup where thermal actuators and tactile actuators are contained in a sleave wearable. Virtual reality interactions are integrated. The VR platform used for the interactions was the META QUEST 3 VR headset with scenes created using the UNITY game engine. Two scenes used were referred to as Social Touch (FIG. 5J) and Sci-Fi Effects (FIGS. 5K and 5L).

FIG. 5J shows a thermal sensation wearable used with a VR application. FIG. 5J provides a passive interaction scenario where participants were placed in a virtual household setting sitting at a table. The user observed their virtual arms from a first-person viewpoint, which was facilitated by the META SDK's avatar features. A virtual human is sitting nearby, who gently stroked the partipant's virtual hand from elbow to wrist using an index and middle finger. The thermal sleave, which is an instance of a wearable thermal sensory output device 210, is time synchronized with the running VR application. Participants experienced the touch and temperature sensation, which enhanced their immersive experience. Most participants found the term-tactile sensations smoothly and clearly.

FIG. 5K shows a thermal sensation wearable used with a VR application to charge up a powered sleeve. FIG. 5L shows a thermal sensation wearable used with a VR application to charge down a powered sleeve. Specifically, as the VR scene shows a forearm sleave charging up, temperature sensations consistent with the VR scene are conveyed to a wearable sleave using thermal and tactile actuators. Cooling sensations are similarly shown and experienced as thermal sensations as the forearm sleeve of the VR scene powers down. Participants remarked that a high level of immersion resulted and that users felt like they had gained powers and could shoot energy out of their hands. Interestingly, some participants felt increasing tactile and thermal intensity during a charge up sequence and decreasing tactile and thermal intensity during a charge down sequence. Haptic feedback provided through the wearable sleeve provided vibrations with a constant average intensity and thermal stimulation of always increasing intensity regardless of the scenario.

Hand Embodiment/Experiment

Figure 6A:
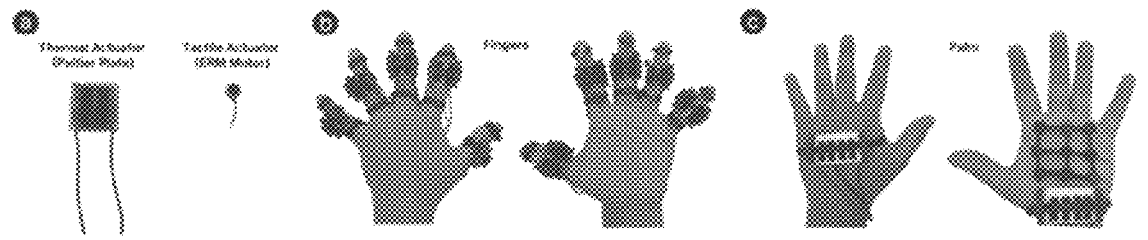
FIG. 6A shows a setup with thermal and tactile actuators worn about the hands and palms.

FIG. 6A shows a setup with thermal and tactile actuators worn about the hands and palms. Section (a) shows a thermal actuator 110 and a tactile actuator 120 used. Section (b) shows an experimental setup for actuators positioned about the fingers and thumb. Section (c) shows positioning of actuators about a back of a hand and the palm of a wearer. The actuator arrangement was to capture thermal sensations to permit a wearer to interact with hot objects within a virtual environment. For example, a wearer could touch and throw fireballs in a virtual environment and feel respective thermal sensations upon their hands.

As shown, the setup combines thermal and vibrotactile actuators to produce thermal reference illusions on the palm and fingers. The thermal actuators are flexible Peltier-based thermal actuator paired with heatsinks. The heatsinks effectively dissipate heat, maintaining the non-actuation side at ambient temperature and ensuring a clear contrast with the activated side.

Figure 6B:
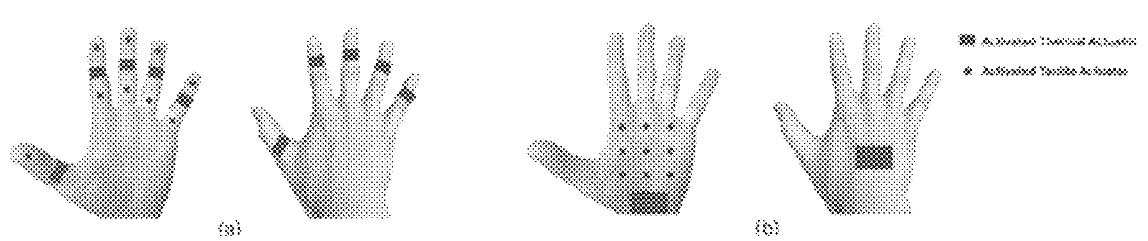
FIG. 6B illustrates regions where thermal actuators and tactile actuators are placed relative to a hand.

FIG. 6B illustrates regions where thermal actuators and tactile actuators are placed relative to a hand. Activated thermal actuators are shown as a red rectangle. Activated tactile actuators are shown as a blue circle. The positions of FIG. 6B correspond to the hardware shown in FIG. 6A.

With regard to the fingers, ten thermal actuators are positioned in the center of the proximal phalanx for the thumb and middle phalanges for the other four fingers, on both the ventral (inner) and dorsal (outer) sides. The ventral placement aimed to study thermal referral sensations within the fingers, while the dorsal placement explored alternative locations to avoid obstructions during virtual object manipulation.

Nine vibrotactile actuators were placed at the center of the distal phalanx for the thumb and distal and proximal phalanges for the other four fingers, exclusively on the ventral side. Placement accommodated a presence of thermal actuators on the middle phalanges and facilitated a creation of thermal illusions through interactions with thermal actuators on the ventral or dorsal side.

With regard to the palm, two larger-size thermal actuators were strategically positioned for the palm. Once was placed at the center of the palm's lower edge to avoid interference with virtual object manipulation. Another thermal actuator was positioned at the center of the dorsal side of the hand, which also avoids interference with virtual object manipulation.

Nine vibrotactile actuators were arranged in a 3×3 array on the palm. This design can be extended to cover the entire palm surface and to maintain a high number of combinations in thermal pattern rendering. The array is anchored by the metacarpophalangeal joints of the index and ring fingers, representing the top left and right corners of the array, respectively. The remaining seven points of the array were equally distributed along lines parallel to the lower edge of the palm, maintaining symmetry and equal spacing within the array.

Placements shown for the thermal actuators and the tactile actuators ensure a thermal energy is generated within each thermal mobility region and that anatomy boundaries are accounted for (see FIG. 1D).

Figure 6C:
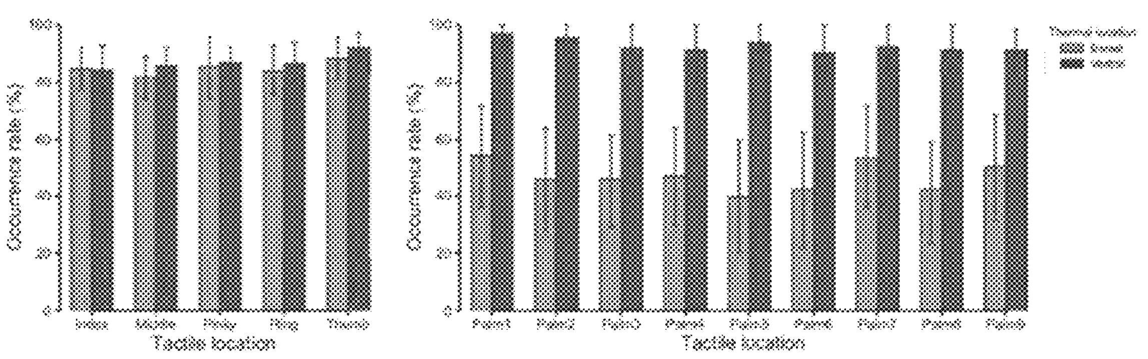
FIG. 6C shows occurrence rates of thermal sensations felt on the fingers and palms per the setup of FIG. 6A.

FIG. 6C shows occurrence rates of thermal sensations felt on the fingers and palms per the setup of FIG. 6A. For finger conditions, the occurrence rate of perceived thermal sensations at the tactile location is notably high, regardless of whether the thermal actuator was placed on the dorsal or ventral side. For each finger, the results between two phalanges showed no statistical difference and were aggregated by the mean occurrence rate. This finding demonstrates that generating localized thermal sensations on the ventral side is viable by positioning the thermal actuator on the dorsal side of the finger. The distribution pattern on each finger position, whether on the ventral or dorsal side, was quite similar, showing that the effective thermal perception is achievable regardless of the thermal actuator's placement.

Palm conditions exhibited a substantial discrepancy in the occurrence rate of thermal referral between the dorsal (46.5%) and ventral (92.4%) sides. The discrepancy indicates that while localized thermal sensation can be achieved on the ventral side, placing the thermal actuator on the dorsal side may be disfavored when generating thermal sensations on the palm.

Figure 6D:
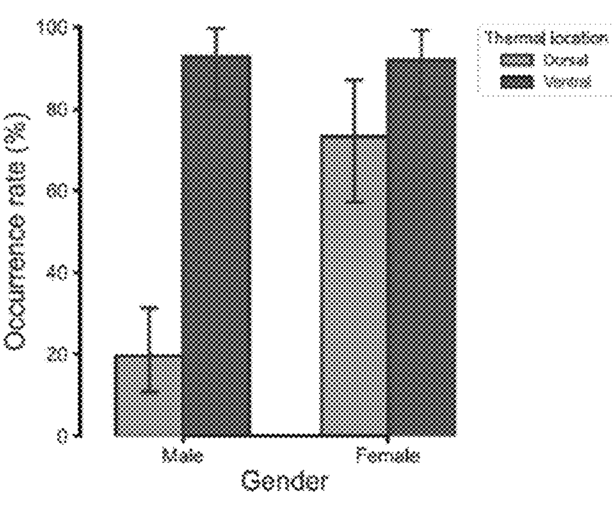
FIG. 6D shows a significant discrepancy exists in thermal referral occurrence rates on the dorsal side the palm between male (19.5%) and female (73.5%) participants.

FIG. 6D shows a significant discrepancy exists in thermal referral occurrence rates on the dorsal side the palm between male (19.5%) and female (73.5%) participants. A smaller palm size of female participants of the experiment, which leads to a reduced spatial summation effect for thermal sensation compared to male participants. Additionally, generally females exhibit a higher thermal sensitivity with regards to the palm than males that may contribute to a greater likelihood of perceiving subtle thermal sensations.

Figure 6E:
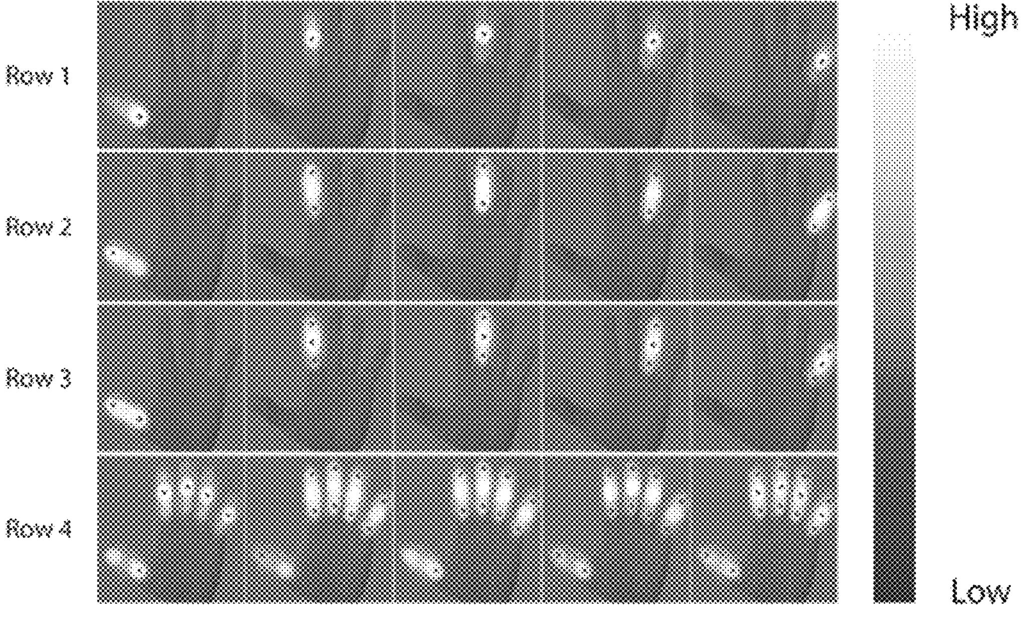
FIG. 6E shows a perceived thermal distribution on the fingers.

FIG. 6E shows a perceived thermal distribution on the fingers. As noted by the images of FIG. 6E, distribution closely aligns with the activated vibrotactile patterns, indicating the perception of thermal patterns on the fingers. With regard to Row 1, a distribution for a simple pattern maintains a high concentration, albeit relatively more dispersed compared to other positions on each finger and even across different sections of the thumb. With regard to Row 2, in more complex patterns involving two activated vibrotactile actuators per finger, the perceived thermal distribution tended to center around the middle phalanx. With regard to Row 3, for patterns involving three vibrotactile actuators, a similar centralized distribution effect was observed, particularly on fingers other than the thumb. With regard to Row 4, The full finger pattern covers each finger with varying numbers of actuators. For fingers other than the thumb, these patterns show more concentration at the middle phalanx compared to the single-finger patterns in Rows 1, 2, and 3.

Figure 6F:
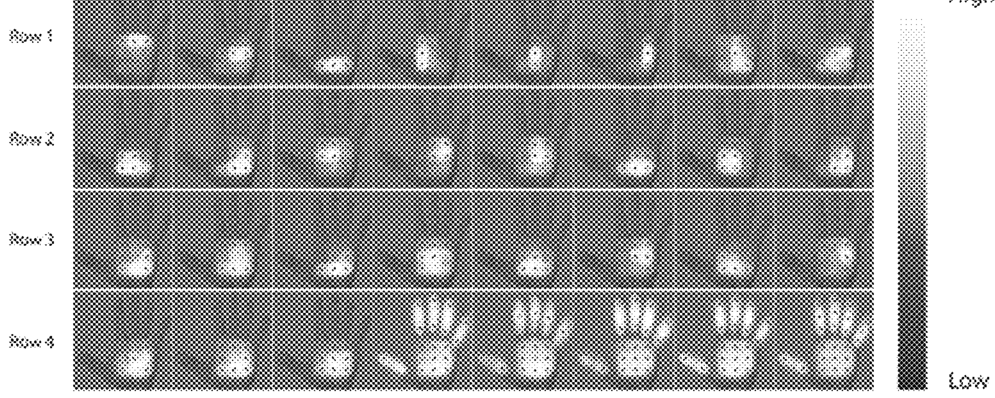
FIG. 6F shows a perceived thermal distribution on the palm.

FIG. 6F shows a perceived thermal distribution on the palm. Thermal patterns on the palm show perceived thermal sensation distribution covers the activated vibrotactile actuator positions while exhibiting dispersion across a wider range of area. With regard to Row 1, less complex patterns demonstrated a more accurate thermal distribution when closer to the thermal actuator. With regard to Row 2, in more complex patterns, the proximity effect is evident with closer vibrotactile patterns to the thermal actuator resulting in better matches in perceived thermal sensations. With regard to Row 3, when complexity of the pattern is further extended, a full-hand thermal perception appears. This effect could be a result of the increased number of vibrotactile actuators covering a relatively larger area. With regard to row 4, a high match is achieved between perceived thermal sensations and activated vibrotactile actuators. Patterns with fewer activated vibrotactile actuators exhibited similar perceived thermal sensations, which means that full-hand thermal sensation render could be achieved with patterns involving fewer activated vibrotactile actuators.

Figure 6G:
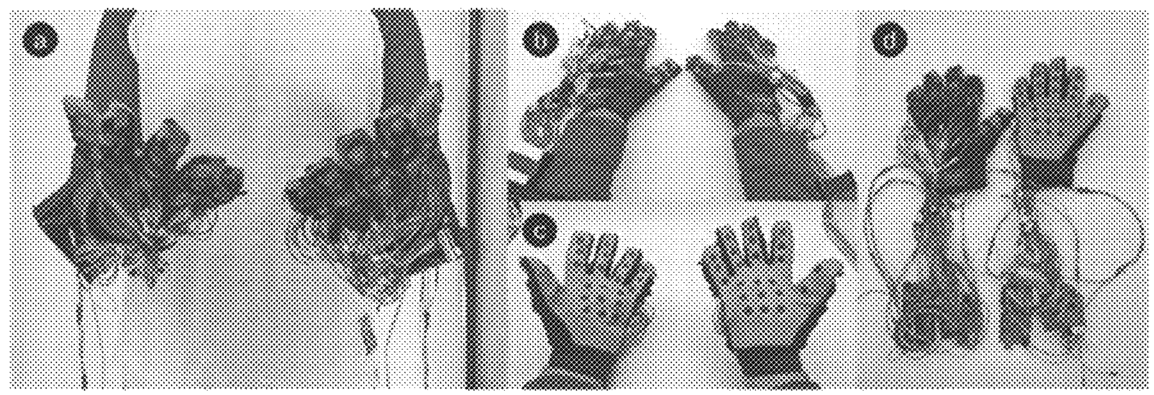
FIG. 6G shows a glove design for receiving thermal sensation output.

FIG. 6G shows a glove design for receiving thermal sensation output. Placement and selection of thermal actuators and tactile actuators for the glove is consistent with that of FIG. 6A, where a frame of the device/peripheral is a glove. VELCRO straps were employed to secure the finger actuators allowing for flexible positioning to accommodate different finger sizes. Thermal actuators were strategically positioned to conform to finger curves and were also held in place via VELCRO straps. Wiring was maintained laong the glove's inner edge to avoid interference.

Figure 6H:
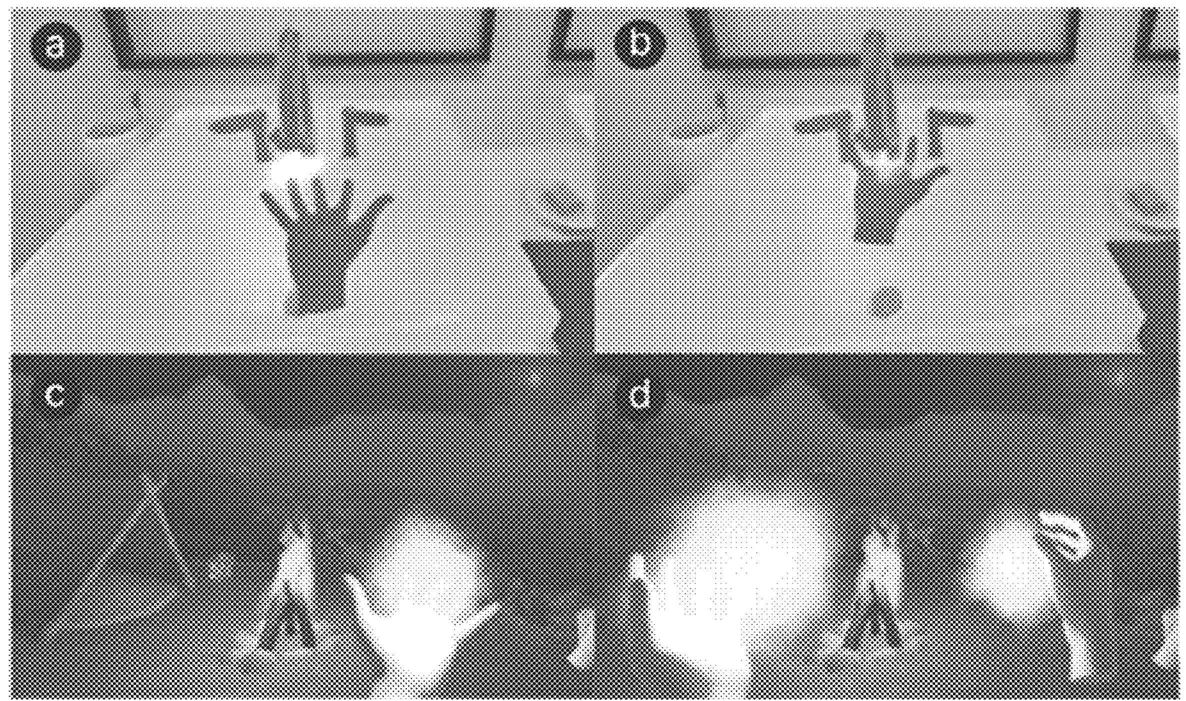
FIG. 6H shows an environment of a virtual reality (VR) application for which the gloves of FIG. 6F provided thermal sensation output.

FIG. 6H shows an environment of a virtual reality (VR) application for which the gloves of FIG. 6F provided thermal sensation output. The VR setup utilized a QUEST 3 headset and UNITY3D for running VR applications. Two distinct scenes were used to explore the capabilities and integration of the gloves with the VR application. The different scenes focused on a manner in which users are able to interact with virtual thermal objects.

Section (a) and (b) show a water faucet scene specifically designed to showcase advantages of rendering localized thermal sensations. The scene replicates a bathroom scenario with a hot water basin. A user is washing off ink stains on their hands. The user uses the virtual faucet's flushing water to wash away the ink stains. When the user's hand touches the water stream, a collision area is rendered with a constant vibrotactile sensation at the nearest vibrotactile actuator location along with a corresponding thermal sensation. A virtual splash is presented on the collision position. Users reported that thermal sensations consistent with the virtual faucet's flushing water were experienced. Interesting a subset of participants experienced an illusion of wetness on their hands.

Section (c) and (d) show a magic fireball scene designed to assess rendering of patterned thermal sensations with virtual object manipulation. Upon entering the virtual scene, users experience a magic fireball initiated in a center of their palms. Users can adjust the fireball's size by pulling or stretching their fingers while wearing gloves. Spatial patters were rendered on the participant's hands every 2 seconds within the contact area between their hands and the fireball. A user can also transfer the fireball to the other hand by bringing both hands closer and continuing to resize the fireball. Participants reported that the thermal sensations of the fireball were felt, which resulted in an immersive experience. Participants were able to distinguish the spawning sensation of the fireball and the transfer of heat as the fireball was moved from one hand to the other.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A device for producing thermal sensations perceived as originating in a region not receiving thermal energy, the device comprising:

a thermal actuator for generating thermal energy within a thermal effect region of a human anatomy area;

a tactile actuator for generating a tactile force in a tactile effect region of the human anatomy area, wherein the thermal effect region and the tactile effect region are non-overlapping, wherein the tactile actuator is one of a plurality of tactile actuators, each of the plurality of tactile actuators comprising a corresponding tactile effect region of the human anatomy area; and an actuator controller connected to the thermal actuator and the tactile actuator, the actuator controller controlling activation and timing of the thermal actuator and the tactile actuator to effectuate a perception that the thermal energy is being applied to the tactile effect region of the human anatomy area, wherein the actuator controller sequentially activates the plurality of tactile actuators while the thermal actuator is activated to effectuate a perception that the thermal energy is moving between tactile effect regions of the plurality of tactile actuators depending upon which of the tactile effect regions are active.

2. The device of claim 1, wherein the actuator controller concurrently activates the thermal actuator and the tactile actuator displacing a location at which thermal sensations are perceived through thermal referral.

3. The device of claim 2, wherein the actuator controller utilizes sense masking so that the thermal sensations from the thermal actuator are not perceived as occurring within the thermal effect region.

4. The device of claim 1, further comprising:

a frame coupled to the thermal actuator and the tactile actuator, wherein the frame establishes a relative distance between the thermal actuator and the tactile actuator, wherein thermal sensations generated by the thermal actuator are perceived as occurring the relative distance away from the thermal actuator.

5. The device of claim 4, wherein the frame is a flexible fabric of a wearable to be worn proximate to the human anatomy area, which includes the thermal effect region and the tactile effect region.

6. The device of claim 1, wherein a size of a region within which the thermal energy is perceived is dependent upon a size of the tactile effect region.

7. The device of claim 1, further comprising:

a processor executing instructions stored in a memory, wherein the actuator controller comprises at least a subset of the instructions that when executed by the processor control the activation and timing of the thermal actuator and the tactile actuator.

8. The device of claim 1, further comprising:

a communicator configured to receive a thermal profile from a system, said thermal profile defining the activation and the timing of the thermal actuator and the tactile actuator.

9. A method for producing thermal sensations perceived as originating in a region not receiving thermal energy, the method comprising:

receiving a thermal profile from a remote system, wherein the thermal profile defines a location and a timing with which thermal sensations are to be perceived within a human anatomy area, wherein the thermal profile is device independent;

generating an actuator profile, which is device dependent, consistent with the thermal profile;

triggering activation of a thermal actuator and a tactile actuator, each positioned within the human anatomy area;

generating thermal energy using the thermal actuator within a thermal effect region of the human anatomy area;

generating a tactile sensation using the tactile actuator in a tactile effect region of the human anatomy area, wherein the thermal effect region and the tactile effect region are non-overlapping;

timing the generating of the thermal energy and the generating of the tactile sensation to effectuate a perception that the thermal energy is being applied to the tactile effect region of the human anatomy area; and timing and quantifying the generating of the thermal energy and the generating of the tactile sensation in accordance with the actuator profile.

10. The method of claim 9, wherein the timing and generating concurrently activates the thermal actuator and the tactile actuator displacing a location at which thermal sensations are perceived through thermal referral.

11. The method of claim 10, wherein the timing and generating utilize sense masking so that thermal sensations from the thermal actuator are not perceived as occurring within the thermal effect region.

12. The method of claim 9, further comprising:

receiving a communication for generating thermal output from a running application, wherein the triggering, the generating of the thermal energy, the generating of the tactile sensation, and the timing occur responsive to and in accordance with the communication.

13. The method of claim 12, wherein the running application comprise an extended reality application, wherein the thermal actuator and the tactile actuator are components of a peripheral integrated with the extended reality application for receiving thermal sensation output in accordance with events time synchronized with the extended reality application.

14. The method of claim 9, further comprising:

generating a second tactile sensation in a second tactile effect region using a second tactile actuator, which is active while the tactile actuator and the thermal actuator are active to effectuate a perception that the thermal energy is being applied to a region that is a sum of the tactile effect region and the second tactile effect region.

15. The method of claim 9, further comprising:

generating a second tactile sensation in a second tactile effect region using a second tactile actuator, which is active after the tactile actuator is active, wherein the thermal actuator is active for a duration that either the tactile actuator is active and that the second tactile actuator is active to effectuate a perception that the thermal energy moves from the tactile effect region to the second tactile effect region.

16. A method for producing thermal sensations perceived as originating in a region not receiving thermal energy, the method comprising:

triggering activation of a thermal actuator and a tactile actuator, each positioned within a human anatomy area;

generating thermal energy using the thermal actuator within a thermal effect region of the human anatomy area;

generating a tactile sensation using the tactile actuator in a tactile effect region of the human anatomy area, wherein the thermal effect region and the tactile effect region are non-overlapping;

timing the generating of the thermal energy and the generating of the tactile sensation to effectuate a perception that the thermal energy is being applied to the tactile effect region of the human anatomy area; and generating a second tactile sensation in a second tactile effect region using a second tactile actuator, which is active after the tactile actuator is active, wherein the thermal actuator is active for a duration that either the tactile actuator is active and that the second tactile actuator is active to effectuate a perception that the thermal energy moves from the tactile effect region to the second tactile effect region.

17. The method of claim 16, wherein the timing and generating utilize sense masking so that thermal sensations from the thermal actuator are not perceived as occurring within the thermal effect region.

18. The method of claim 16, further comprising:

receiving a thermal profile from a remote system, wherein the thermal profile defines a location and a timing with which thermal sensations are to be perceived within the human anatomy area.

19. The method of claim 16, further comprising:

receiving a communication for generating thermal output from a running application, wherein the triggering, the generating of the thermal energy, the generating of the tactile sensation, and the timing occur responsive to and in accordance with the communication.

20. The method of claim 19, wherein the running application comprise an extended reality application, wherein the thermal actuator and the tactile actuator are components of a peripheral integrated with the extended reality application for receiving thermal sensation output in accordance with events time synchronized with the extended reality application.

* * * * *